(12) United States Patent
Phelan

(10) Patent No.: US 8,404,759 B2
(45) Date of Patent: Mar. 26, 2013

(54) SILICONE HYDROGEL MATERIALS WITH CHEMICALLY BOUND WETTING AGENTS

(75) Inventor: John Christopher Phelan, Duluth, GA (US)

(73) Assignee: Novartis AG, Basel (CH)

( * ) Notice: Subject to any disclaimer, the term of this patent is extended or adjusted under 35 U.S.C. 154(b) by 524 days.

(21) Appl. No.: 12/616,169

(22) Filed: Nov. 11, 2009

(65) Prior Publication Data

US 2010/0120939 A1 May 13, 2010

Related U.S. Application Data

(60) Provisional application No. 61/114,228, filed on Nov. 13, 2008.

(51) Int. Cl.
*G02B 1/04* (2006.01)
*C08F 290/14* (2006.01)
*G02C 7/02* (2006.01)
*G02C 7/04* (2006.01)

(52) U.S. Cl. ... 523/107; 523/106; 424/429; 351/159.02; 351/159.33; 351/159.34

(58) Field of Classification Search ............ 523/107, 523/106; 424/429; 351/159.02, 159.33, 351/159.34

See application file for complete search history.

(56) References Cited

U.S. PATENT DOCUMENTS

| | | | |
|---|---|---|---|
| 4,312,575 A | 1/1982 | Peyman | |
| 4,444,711 A | 4/1984 | Schad | |
| 4,460,534 A | 7/1984 | Boehm | |
| 4,467,082 A | 8/1984 | Shirahata | |
| 4,632,844 A | 12/1986 | Yanagihara | |
| 4,666,953 A * | 5/1987 | Klemarczyk et al. | 522/34 |
| 5,010,141 A | 4/1991 | Mueller | |
| 5,034,461 A | 7/1991 | Lai | |
| 5,079,319 A | 1/1992 | Mueller | |
| 5,227,432 A | 7/1993 | Jung | |
| 5,244,981 A | 9/1993 | Seidner | |
| 5,314,960 A | 5/1994 | Spinelli | |
| 5,314,961 A | 5/1994 | Anton | |
| 5,331,067 A | 7/1994 | Seidner | |
| 5,358,995 A | 10/1994 | Lai | |
| 5,387,632 A | 2/1995 | Lai | |
| 5,416,132 A | 5/1995 | Yokoyama | |
| 5,449,729 A | 9/1995 | Lai | |
| 5,512,205 A | 4/1996 | Lai | |
| 5,527,925 A | 6/1996 | Chabrecek | |
| 5,612,389 A | 3/1997 | Chabrecek | |
| 5,612,391 A | 3/1997 | Chabrecek | |
| 5,621,018 A | 4/1997 | Chabrecek | |
| 5,760,100 A | 6/1998 | Nicolson | |
| 5,843,346 A | 12/1998 | Morrill | |
| 5,849,811 A | 12/1998 | Nicolson | |
| 5,894,002 A | 4/1999 | Boneberger | |
| 5,959,117 A | 9/1999 | Ozark | |
| 5,981,615 A | 11/1999 | Meijs | |
| 5,981,669 A | 11/1999 | Valint, Jr. | |
| 5,981,675 A | 11/1999 | Valint, Jr. | |
| 5,998,498 A | 12/1999 | Vanderlaan | |
| 6,197,842 B1 * | 3/2001 | Marchin et al. | 522/35 |
| 6,204,306 B1 | 3/2001 | Chabrecek | |
| 6,312,706 B1 | 11/2001 | Lai | |
| 6,367,929 B1 | 4/2002 | Maiden | |
| 6,376,568 B1 | 4/2002 | Baudin | |
| 6,451,871 B1 | 9/2002 | Winterton | |
| 6,596,294 B2 | 7/2003 | Lai | |
| 6,627,124 B1 | 9/2003 | Herbrechtsmeier | |
| 6,693,141 B2 | 2/2004 | Baudin | |
| 6,719,929 B2 | 4/2004 | Winterton | |
| 6,762,264 B2 | 7/2004 | Künzler | |
| 6,793,973 B2 | 9/2004 | Winterton | |
| 6,811,805 B2 | 11/2004 | Gilliard | |
| 6,822,016 B2 | 11/2004 | McCabe | |
| 6,849,671 B2 | 2/2005 | Steffen | |
| 6,852,353 B2 | 2/2005 | Qiu | |
| 6,858,218 B2 | 2/2005 | Lai | |
| 6,884,457 B2 | 4/2005 | Gilliard | |
| 6,896,926 B2 | 5/2005 | Qiu | |
| 6,926,965 B2 | 8/2005 | Qiu | |
| 6,940,580 B2 | 9/2005 | Winterton | |
| 6,943,203 B2 | 9/2005 | Vanderlaan | |
| 7,040,756 B2 | 5/2006 | Qiu | |
| 7,052,131 B2 | 5/2006 | McCabe | |
| 7,078,074 B2 | 7/2006 | Matsuzawa | |

(Continued)

FOREIGN PATENT DOCUMENTS

| | | |
|---|---|---|
| EP | 1754728 A1 | 2/2007 |
| WO | 2007128051 A1 | 11/2007 |
| WO | 2008116131 A2 | 9/2008 |

OTHER PUBLICATIONS

PCT International Search Report dated Jun. 4, 2010 for International Application No. PCT/US2009/063945, International Filing Date Nov. 11, 2009.

PCT Written Opinion of the International Searching Authority dated Jun. 4, 2010 for International Application No. PCT/US2009/063945, International Filing Date Nov. 11, 2009.

*Primary Examiner* — Michael Pepitone

(74) *Attorney, Agent, or Firm* — Jian Zhou

(57) ABSTRACT

The invention provide a new class of silicone-containing prepolymers containing ethylenically unsaturated groups and latent UV-activated free radical generating moieties. This class of silicone-containing prepolymer is capable of being actinically crosslinked in the presence of one or more hydrophilic vinylic monomers to form a silicone hydrogel material with a hydrophilic surface without post curing surface treatment. The present invention is also related to silicone hydrogel contact lenses made from this class of silicone-containing prepolymers and a vinylic monomer having a latent UV-activated free radical generating moiety.

15 Claims, No Drawings

U.S. PATENT DOCUMENTS

| | | |
|---|---|---|
| 7,091,283 B2 | 8/2006 | Müller |
| 7,214,809 B2 | 5/2007 | Zanini |
| 7,249,848 B2 | 7/2007 | Laredo |
| 7,416,737 B2 | 8/2008 | Alvarez-Carrigan |
| 7,423,108 B2 | 9/2008 | Kunzler |
| 7,461,937 B2 | 12/2008 | Steffen |
| 7,521,488 B2 | 4/2009 | Steffen |
| 7,550,519 B2 | 6/2009 | Phelan |
| 7,649,058 B2 | 1/2010 | McCabe |
| 7,666,921 B2 | 2/2010 | McCabe |
| 7,691,916 B2 | 4/2010 | McCabe |
| 2002/0107297 A1 | 8/2002 | Baudin |
| 2002/0107324 A1 | 8/2002 | Vanderlaan |
| 2003/0044447 A1 | 3/2003 | Zanini |
| 2003/0125498 A1 | 7/2003 | McCabe |
| 2003/0162862 A1 | 8/2003 | McCabe |
| 2004/0115242 A1 | 6/2004 | Meyers |
| 2004/0150788 A1 | 8/2004 | Andersson |
| 2004/0151755 A1 | 8/2004 | Rathore |
| 2004/0186248 A1 | 9/2004 | Vanderlaan |
| 2004/0209973 A1 | 10/2004 | Steffen |
| 2004/0213827 A1 | 10/2004 | Enns |
| 2005/0117112 A1 | 6/2005 | Nayiby |
| 2005/0154080 A1 | 7/2005 | McCabe |
| 2005/0159502 A1 | 7/2005 | Steffen |
| 2005/0179862 A1 | 8/2005 | Steffen |
| 2005/0237483 A1* | 10/2005 | Phelan .................. 351/162 |
| 2005/0260249 A1 | 11/2005 | Neely |
| 2006/0007391 A1 | 1/2006 | McCabe |
| 2007/0043140 A1 | 2/2007 | Lorenz |
| 2007/0138692 A1 | 6/2007 | Ford |
| 2007/0142551 A1 | 6/2007 | Kunzler |
| 2007/0229757 A1 | 10/2007 | McCabe |
| 2008/0015282 A1 | 1/2008 | McCabe |
| 2008/0174035 A1 | 7/2008 | Winterton |
| 2008/0231798 A1 | 9/2008 | Zhou |
| 2008/0274207 A1 | 11/2008 | Nayiby |
| 2008/0299179 A1 | 12/2008 | Rathore |
| 2008/0316424 A1 | 12/2008 | McCabe |
| 2009/0059164 A1 | 3/2009 | Steffen |
| 2009/0091704 A1 | 4/2009 | Steffen |
| 2009/0252868 A1 | 10/2009 | Phelan |
| 2009/0276042 A1 | 11/2009 | Hughes |
| 2010/0084775 A1 | 4/2010 | McCabe |
| 2010/0133710 A1 | 6/2010 | McCabe |
| 2010/0152084 A1 | 6/2010 | Rathore |

* cited by examiner

US 8,404,759 B2

SILICONE HYDROGEL MATERIALS WITH CHEMICALLY BOUND WETTING AGENTS

This application claims the benefit under 35 U.S.C. §119 (e) of U.S. provisional application Ser. No. 61/114,228 filed on Nov. 13, 2008, herein incorporated by reference in its entirety.

The present invention is related to a class of silicone-containing prepolymers having latent UV-activated radical generating moieties and uses thereof. In particular, the present invention is related to silicone hydrogel contact lenses made from this class of silicone-containing prepolymers.

BACKGROUND

In recent years, soft silicone hydrogel contact lenses become more and more popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen to permeate through the lens to the cornea and to have minimal adverse effects on corneal health.

However, a silicone hydrogel material typically has a surface or at least some areas of its surface which is hydrophobic (non-wettable). Hydrophobic surface or surface areas will up take lipids or proteins from the ocular environment and may adhere to the eye. Thus, a silicone hydrogel contact lens will generally require a surface modification.

A known method for modifying the hydrophilicity of a relatively hydrophobic contact lens material is through the use of a plasma treatment, for example, commercial lenses such as Focus NIGHT & DAY™ and O2OPTIX™ (CIBA VISION), and PureVision™ (Bausch & Lomb). Advantages of a plasma coating is its durability, relatively high hydrophilicity (or good wettability), and low susceptibility to lipid and protein deposition and adsorption. But, plasma treatment of silicone hydrogel contact lenses may not be cost effective, because the preformed contact lenses must be dried before plasma treatment and because of relative high capital investment associated with plasma treatment equipments.

Another method for modifying the hydrophilicity of a relatively hydrophobic contact lens material is a layer-by-layer (LbL) polyionic material deposition technique (see for example, U.S. Pat. Nos. 6,451,871, 6,717,929, 6,793,973, 6,884,457, 6,896,926, 6,926,965, 6,940,580). This technique can provide a cost effective process for rendering a silicone hydrogel material wettable. However, such LbL coating may be less durable than a plasma coating for extended wear purpose.

Another method for modifying the hydrophilicity of a relatively hydrophobic contact lens material is a layer-by-layer (LbL) polyionic material deposition technique (see for example, U.S. Pat. Nos. 6,451,871, 6,719,929, 6,793,973, 6,884,457, 6,896,926, 6,926,965, 6,940,580). This technique can provide a cost effective process for rendering a silicone hydrogel material wettable. However, such LbL coating may be less durable than a plasma coating for extended wear purpose.

Therefore, there is a need for a method of producing silicone hydrogel contact lenses with wettable and durable coating (surface) in a cost effective manner.

SUMMARY OF THE INVENTION

The present invention, in one aspect, provides an actinically crosslinkable prepolymer. The prepolymer of the invention comprises: in the copolymer chain of the prepolymer, (1) siloxane units derived from one or more siloxane-containing vinylic monomers and/or one or more siloxane-containing macromers; (2) hydrophilic units derived from one or more hydrophilic vinylic monomers and/or one or more hydrophilic macromers; (3) chain-extending units having latent UV-activated free radical generating (UV-AFRG) moieties; and (4) ethylenically unsaturated groups, wherein the prepolymer is capable of being actinically crosslinked, in the presence of one or more hydrophilic vinylic monomers, to form a silicone hydrogel material including dangling hydrophilic polymer chains each of which is formed from the one or more hydrophilic vinylic monomers and covalently attached to the polymer matrix of the silicone hydrogel material through one chain-extending unit.

In another aspect, the invention provides a soft contact lens comprising a silicone hydrogel material which is obtained by curing a lens-forming material in a mold, wherein the lens-forming material comprises an actinically crosslinkable prepolymer of the invention and at least one hydrophilic vinylic monomer, wherein the silicone hydrogel material includes dangling hydrophilic polymer chains each of which is formed from the at least one hydrophilic vinylic monomer and covalently attached to the polymer matrix of the silicone hydrogel material, wherein the formed soft contact lens has a hydrophilic surface without post-curing surface treatment.

In a further aspect, the invention provides a method for producing soft contact lenses by photopolymizring a lens-forming material in a mold, wherein the lens-forming material comprises a prepolymer of the invention and at least one hydrophilic vinylic monomer.

In a still further aspect, the invention provides a vinylic monomer including a latent UV-activated free radical generating moiety (UV-AFRG).

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case.

A "hydrogel" or "hydrogel material" refers to a polymeric material which can absorb at least 10 percent by weight of water when it is fully hydrated. A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenicaly unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which can be used to prepare a homopolymer typically yields a polymer that is water-soluble or can absorb at least 10 percent by weight water when fully hydrated.

A "hydrophobic vinylic monomer", as used herein, refers to a vinylic monomer which can be used to prepare a polymer that is insoluble in water and can absorb less than 10 percent by weight water when fully hydrated.

A "macromer" refers to a medium and high molecular weight compound or polymer that contains ethylenically one or more unsaturated groups capable of undergoing further polymerizing and/or crosslinking reactions. Medium and high molecular weight typically means average molecular weights greater than 700 Daltons.

A "prepolymer" refers to a starting polymer which contains ethylenically unsaturated groups and can be cured (e.g., crosslinked and/or polymerized) actinically or thermally to obtain a crosslinked and/or polymerized polymer having a molecular weight much higher than the starting polymer.

A "silicone-containing prepolymer" refers to a prepolymer which contains silicone and can be crosslinked upon actinic radiation or thermally to obtain a crosslinked polymer having a molecular weight much higher than the starting polymer.

The term "fluid" as used herein indicates that a material is capable of flowing like a liquid.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "ethylenically functionalize" in reference to a copolymer or a compound is intended to describe that one or more ethylenically unsaturated groups have been covalently attached to a copolymer or compound through the pendant or terminal functional groups of the copolymer or the compound according to a coupling process.

As used herein, the term "multiple" refers to two or more.

The term "dangling hydrophilic polymer chain" in reference to a silicone hydrogel material of the invention is intended to describe that the each of the hydrophilic polymer chains is anchored to the polymer matrix of the silicone hydrogel through one single covalent linkage (preferably at one of the ends of the hydrophilic polymer chain).

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN) or 2,2'-azobis(2,4-dimethylvaleronitrile).

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. For example, a spatial limitation of UV radiation can be achieved by using a mask or screen that has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region. The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment be heat resistant, non-toxic and insoluble in aqueous solutions.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Patent Application No. 60/811,949 (herein incorporated by reference in its entirety), and LbL coating as described in U.S. Pat. Nos. 6,451,871, 6,719,929, 6,793,973, 6,811,805, 6,896,926 (herein incorporated by references in their entirety). A preferred class of surface treatment processes are plasma processes, in which an ionized gas is applied to the surface of an article. Plasma gases and processing conditions are described more fully in U.S. Pat. Nos. 4,312,575 and 4,632,844, which are incorporated herein by reference. The plasma gas is preferably a mixture of lower alkanes and nitrogen, oxygen or an inert gas.

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged advancing water contact angle of about 110 degrees or less, preferably about 100 degrees or less, more preferably about 90 degrees or less, more preferably about 80 degrees or less, while having an averaged receding water contact angle of about 80 degrees or less, preferably about 60 degrees or less.

An "average contact angle" refers to a water contact angle (advancing and receding angle measured by sessile drop method), which is obtained by averaging measurements of at least 3 individual contact lenses.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3 \text{ oxygen})/(cm^2)(sec)(mm\ Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3 \text{ oxygen})(mm)/(cm^2)(sec)(mm\ Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm). In accordance with the invention, a high oxygen permeability in reference to a material or a contact lens characterized by apparent oxygen permeability of at least 35 barrers or larger measured with a sample (film or lens) of 100 microns in thickness.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D=-n'/(A \times dc/dx)$$

where
 $n'$=rate of ion transport [mol/min]
 A=area of lens exposed [mm$^2$]
 D=Ionoflux Diffusion Coefficient [mm$^2$/min]
 dc=concentration difference [mol/L]
 dx=thickness of lens [mm]
The Ionoton Ion Permeability Coefficient, P, is then determined in accordance with the following equation:

$$\ln(1-2C(t)/C(0))=-2APt/Vd$$

where:
 C(t)=concentration of sodium ions at time t in the receiving cell
 C(0)=initial concentration of sodium ions in donor cell
 A=membrane area, i.e., lens area exposed to cells
 V=volume of cell compartment (3.0 ml)
 d=average lens thickness in the area exposed
 P=permeability coefficient An Ionoflux Diffusion Coefficient, D, of greater than about 1.5×10$^{-6}$ mm$^2$/min is preferred, while greater than about 2.6×10$^{-6}$ mm$^2$/min is more preferred and greater than about 6.4×10$^{-6}$ mm$^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

In general, the invention is directed to silicone hydrogel materials with chemically bound internal wetting agents. The invention is partly based on the discovery that such silicone hydrogel materials can be prepared in a one-step UV-curing operation by using a class of actinically crosslinkable silicone-containing prepolymers containing two types of pendant groups, one being ethylenically unsaturated groups and the other latent UV-activated free radical generating moieties (e.g., phenone or the like). It is discovered that such prepolymers can be crosslinked in the presence of one or more hydrophilic vinylic monomers, to form a silicone hydrogel contact lens having a relatively high oxygen permeability and a hydrophilic surface without post-curing surface treatment. It is believed that pendant ethylenically unsaturated groups of the prepolymer can be crosslinked by actinic irradiation to form a silicone hydrogel polymer matrix, while under actinic irradiation the pendant UV-activated free radical generating moieties (hereinafter refers to "UV-AFRG moieties") can produce free radicals which in turn initiate free radical chain growth polymerization reaction of hydrophilic vinylic monomer(s) to form dangling hydrophilic chains covalently attached to the polymer matrix through parts of the latent UV-activated free radical generating moieties. The dangling hydrophilic polymer chains can render the surface of the resultant silicone hydrogel material hydrophilic without post-curing surface treatment.

The present invention can provide several advantages over the prior art. First, because hydrophilic vinylic monomers, not hydrophilic polymer is used in a lens formulation for making silicone hydrogel contact lenses, the haziness of resultant lenses due to the incompatibility of a hydrophilic polymer with other silicone-containing monomers or macromers can be eliminated or minimized. Second, a wide variety of hydrophilic vinylic monomers can be used to grow hydrophilic polymeric chains (e.g. DMA, NVP, HEMA, HEA, MAA, AA, or the like) on the underlying polymer matrix of a silicone hydrogel lens. Third, because the dangling hydrophilic polymer chains are covalently attached to the polymer matrix of a silicone hydrogel contact lens, there is no leaching of the internal wetting agent over time or removal of the internal wetting agent during lens production process (e.g., extraction, hydration, or the like). The chain length of the internal wetting agent need not be limited to high molecular weight ranges. Fourth, by using hydrophilic monomers, instead of hydrophilic polymers (especially with high molecular weight), a lens formulation can have a relatively low viscosity. A lens formulation with a low viscosity is generally easier to process than a formulation with high viscosity, resulting in fewer defects from bubbles in resultant lenses. Fifth, by using a prepolymer of the invention, there is no need to add photoinitiator into a lens formulation for making contact lenses based on photocuring mechanism, because the prepolymer of the invention contain photoinitiator moieties.

The present invention, in one aspect, provides an actinically crosslinkable prepolymer. The prepolymer of the invention comprises: in the copolymer chain of the prepolymer, (1) siloxane units derived from one or more siloxane-containing vinylic monomers and/or one or more siloxane-containing macromers; (2) hydrophilic units derived from one or more hydrophilic vinylic monomers and/or one or more hydrophilic macromers; (3) chain-extending units having latent UV-AFRG moieties; and (4) ethylenically unsaturated groups, wherein the prepolymer is capable of being actinically crosslinked, in the presence of one or more hydrophilic vinylic monomers, to form a silicone hydrogel material including dangling hydrophilic polymer chains each of which is formed from the one or more hydrophilic vinylic monomers and covalently attached to the polymer matrix of the silicone hydrogel material through one chain-extending unit.

A prepolymer of the invention comprises multiple ethylenically unsaturated groups, preferably three or more ethylenically unsaturated groups.

A prepolymer of the invention also comprises multiple latent UV-AFRG moieties, preferably three or more latent UV-AFRG moieties.

Latent UV-AFRG moieties can be any phenone-containing radicals. A preferred latent UV-AFRG moiety is a radical of formula (I)

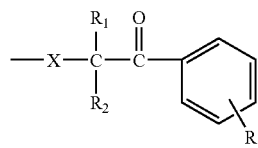

in which R is H, $C_1$-$C_{12}$ alkyl, $C_1$-$C_{12}$ alkoxy, $C_1$-$C_{12}$ alkyl-NH— or —$NR_3R_4$ wherein $R_3$ and $R_4$ independent of each other are $C_1$-$C_8$ alkyl; $R_1$ and $R_2$ independent of each other are hydrogen, $C_1$-$C_8$ alkyl, $C_1$-$C_8$ cycloalkyl, or $C_1$-$C_8$ aryl, or $R_1$ and $R_2$ together are —$(CH_2)_n$— where n is an integer from 2 to 6; X is a linkage selected from the group consisting of

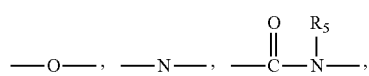

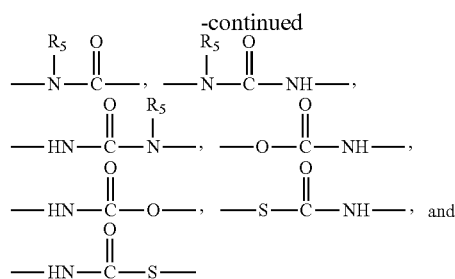

where $R_5$ is H or $C_1$-$C_8$ alkyl. It should be understood that R can be a linkage to the prepolymer backbone. Where R is a linkage, X is terminated with H or $C_1$-$C_8$ alkyl.

In a preferred embodiment, chain-extending units containing latent UV-AFRG moieties are derived from one or more vinylic monomer of formula (1)

in which Z is a moiety capable of generate free radical upon exposure to UV or visible light.

More preferably, chain-extending units containing latent UV-AFRG moieties are derived from one or more vinylic monomer of formula (II) or (III)

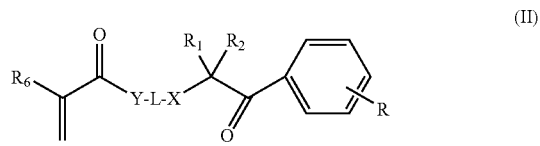

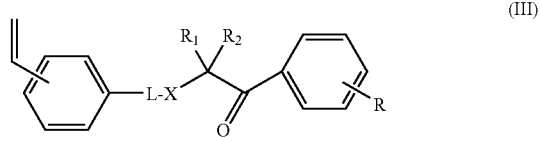

in which R is H, $C_1$-$C_{12}$ alkyl, $C_1$-$C_{12}$ alkoxy, $C_1$-$C_{12}$ alkyl-NH— or —$NR_3R_4$ wherein $R_3$ and $R_4$ independent of each other are $C_1$-$C_8$ alkyl; $R_1$ and $R_2$ independent of each other are hydrogen, $C_1$-$C_8$ alkyl, $C_1$-$C_8$ cycloalkyl, or $C_1$-$C_8$ aryl, or $R_1$ and $R_2$ together are —$(CH_2)_n$— where n is an integer from 2 to 6; X is a linkage selected from the group consisting of —O—, —N—,

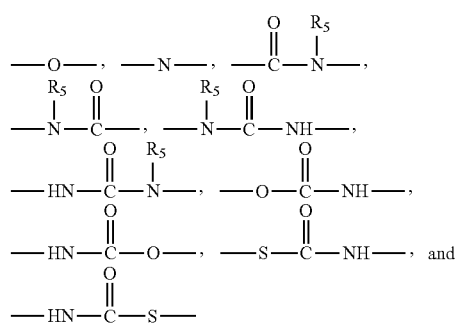

where $R_5$ is H or $C_1$-$C_8$ alkyl; Y is bivalent —$NR_5$— or —O—; L is a divalent radical selected from the group consisting of $C_1$-$C_{12}$ alkylene, $C_1$-$C_{12}$ substituted alkylene, $C_1$-$C_{12}$ cycloalkylene, $C_1$-$C_{12}$ arylalkylene; and $R_6$ is H or $CH_3$.

Preferred examples of vinylic monomer of formula (II) or (III) includes formula (IV) and (V).

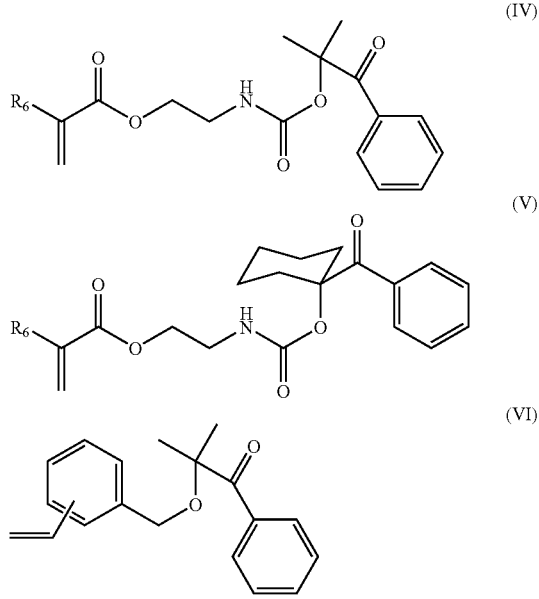

in which $R_6$ is H or $CH_3$

It should be understood that vinyl functionalized radical generating substances other than phenones could also be utilized according to this invention.

In accordance with the invention, a prepolymer of the invention is obtained from an intermediary copolymer with pendant or terminal functional groups and latent UV-AFRG moieties by ethylenically functionalizing the intermediary copolymer (i.e., covalently attaching actinically crosslinkable groups to the intermediary copolymer through the pendant or terminal functional groups, according to any covalently coupling method.

It is well known in the art that a pair of matching reactive groups can form a covalent bond or linkage under known coupling reaction conditions, such as, oxidation-reduction conditions, dehydration condensation conditions, addition conditions, substitution (or displacement) conditions, Diels-Alder reaction conditions, cationic crosslinking conditions, and epoxy hardening conditions. For example, an amino group reacts with aldehyde group to form a Schiff base which may further be reduced; an amino group reacts with an acid chloride to form an amide linkage (—CO—N—); an amino group reacts with an isocyanate to form a urea linkage; an hydroxyl reacts with an isocyanate to form a urethane linkage; an hydroxyl reacts with an epoxy to form an ether linkage (—O—); a hydroxyl reacts with an acid chloride to form an ester linkage.

Exemplary covalent bonds or linkage, which are formed between pairs of crosslinkable groups, include without limitation, ester, ether, acetal, ketal, vinyl ether, carbamate, urea, urethane, amine, amide, enamine, imine, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide.

Exemplary reactive groups include hydroxyl group, amine group, amide group, anhydride group, sulfhydryl group, —COOR (R and R' are hydrogen or $C_1$ to $C_8$ alkyl groups), halide (chloride, bromide, iodide), acyl chloride, isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, hydroxysulfosuccinimide ester, imido ester, hydrazine, axidonitrophenyl group, azide, 3-(2-pyridyl dithio)proprionamide, glyoxal, aldehyde, epoxy.

It is understood that coupling agents may be used. For example, a carbodiimide can be used in the coupling of a carboxyl and an amine to form an amide linkage between the molecules being coupled. Examples of carbodiimides are 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide, or mixtures thereof. N-hydroxysuccinimide (NHS) or N-hydroxysulfosuccinimide may be desirably included in carbodiimide (e.g., EDC)-mediated coupling reaction to improve coupling (conjugation) efficiency. EDC couples NHS to carboxyls, resulting in an NHS-activated site on a molecule. The formed NHS-ester can react with amines to form amides.

Preferably, the functional group of the intermediary copolymer is selected from the group consisting of hydroxyl groups (—OH), primary amino groups (—$NH_2$), secondary amino groups (—NHR), carboxyl groups (—COOH), epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or I), acid anhydride groups, and combinations thereof.

Any copolymers, which include siloxane units derived from a siloxane-containing vinylic monomer or macromer, hydrophilic units derived from one or more hydrophilic vinylic monomers, and chain-extending units containing latent UV-AFRG moieties, in the copolymer chain, and pendant or terminal functional groups, can be used as an intermediary copolymer in the invention. Such copolymer should be soluble in water, an organic solvent, a mixture of water and at least one organic solvent, or a mixture of organic solvents.

In accordance with the invention, the term "derived from" in reference to polymeric units in the polymer chain means that the polymeric units are obtained from a specified monomer or macromer in a polymerization reaction.

Example of organic solvents includes without limitation tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amylalcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

It is understood that some reactions are preferably carried out in the presence of a catalyst. For example, the hydroxyisocyanate reaction is advantageously carried out in the presence of a catalyst, since the reaction time can be significantly shortened. Suitable catalysts are for example metal salts such as alkali metal salts or tin salts of organic carboxylic acids, or tertiary amines, for example, $(C_1-C_6-alkyl)_3N$ (triethylamine, tri-n-butylamine), N-methylpyrrolidine, N-methylmorpholine, N,N-dimethylpiperidine, pyridine or 1,4-diaza-bicyclooctane. Tin salts have proved to be particularly effective, especially alkyl-tin salts of carboxylic acids, for example dibutyl tin dilaurate (DBTDL) and tin dioctoate. Reaction of hydroxyl groups with epoxy groups can be catalyzed with for example aluminum chloride or borontrifluoride. One could also convert alcohol groups to their alkoxide forms and then allow them to react with the epoxy groups.

Preferably, an intermediary copolymer is obtained by thermal copolymerization of a composition comprising (1) at least one siloxane-containing monomer having one ethylenically unsaturated group, at least one siloxane-containing macromer having one ethylenically unsaturated group, at least one siloxane-containing monomer having two or more ethylenically unsaturated groups, at least one siloxane-containing macromer having two or more ethylenically unsaturated groups, or a combination of two or more thereof; (2) at least one hydrophilic vinylic monomer; (3) at least one vinylic monomer of formula (II) or (III); and a thermal initiator, provided that at least one of the polymerizable components contains a functional group for covalently attaching one ethylenically unsaturated group. The composition can further comprises one or more polymerizable components selected from the group consisting of a silicone-free crosslinker (i.e., having two or more ethylenically unsaturated groups) with molecular weight less than 700 daltons, a hydrophobic vinylic monomer, a silicone-containing vinylic monomer, and a chain transfer agent (preferably having a functional group capable of undergoing coupling reaction with another function group as described above).

Any known suitable monoethylenically functionalized siloxane-containing monomers or macromers (i.e., polysiloxane-containing monomers or macromers with one sole ethylenically unsaturated group) can be used in the polymerizable composition for preparing the intermediary copolymer. It is believed that siloxane-containing units in a prepolymer can provide resultant silicone hydrogel materials with a relatively high oxygen permeability.

A preferred class of monoethylenically functionalized siloxane-containing monomers or macromers are polysiloxane-containing monomer or macromers defined by formula (VII)

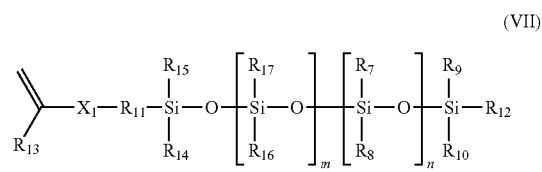

in which $X_1$ denotes —COO—, —CONR$_{18}$—, —OCOO—, or —OCONR$_{18}$—, where each $R_{18}$ is independently H or $C_1$-$C_7$ alkyl; $R_{11}$ denotes a divalent $C_1$-$C_{25}$ alkylene or $C_6$-$C_{30}$ arylalkylene radical, which may interrupted by —O—, —COO—, —CONR$_{18}$—, —OCOO— or —OCONR$_{18}$— and may comprise hydroxy group, primary, secondary, or tertiary amine group, carboxy group, or carboxylic acid; $R_{12}$ is a monovalent $C_1$-$C_{25}$ alkyl or $C_6$-$C_{30}$ aryl radical, which may interrupted by —O—, —COO—, —CONR$_{14}$—, —OCOO— or —OCONR$_{14}$— and may comprise hydroxy group, primary, secondary, or tertiary amine group, carboxy group, or carboxylic acid; $R_7$, $R_8$, $R_9$, $R_{10}$, $R_{14}$, $R_{15}$, $R_{16}$, and $R_{17}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), hydroxy-$C_1$-$C_6$-alkyl or amino-$C_1$-$C_6$-alkyl; m and p independently of each other are an integer of from 5 to 700 and (m+p) is from 5 to 700. Preferred examples of such monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy) propyl terminated, mono-butyl terminated polydimethylsiloxane). Alternatively, monoethylenically functionalized polysiloxanes can be obtained by ethylenically functionalizing of a monofunctionalized polysiloxanes (i.e., with one sole terminal functional group, such as, e.g., —NH$_2$, —OH, —COOH, epoxy group, etc.) as described above. Suitable monofunctionalized polysiloxanes are commercially available, e.g., from Aldrich, ABCR GmbH & Co., Fluorochem, or Gelest, Inc, Morrisville, Pa.

Examples of preferred siloxane-containing vinylic monomers include without limitation 3-methacryloxy propylpentamethyldisiloxane, bis(methacryloxypropyl)tetramethyldisiloxane, N-[tris(trimethylsiloxy)silylpropyl]acrylamide, N-[tris(trimethylsiloxy)silylpropyl]methacrylamide, and tristrimethylsilyloxysilylpropyl methacrylate (TRIS), N-[tris(trimethylsiloxy)silylpropylyl]methacrylamide ("TS-MAA"), N-[tris(trimethylsiloxy)-silylpropyl]acrylamide ("TSAA"), (3-methacryloxy-2-hydroxypropyloxy)propylbis (trimethylsiloxy)methylsilane), (3-methacryloxy-2-hydroxypropyloxy)propyltris(trimethylsiloxy)silane, 3-methacryloxy-2-(2-hydroxyethoxy)propyloxy)propylbis (trimethylsiloxy)methylsilane, N-2-methacryloxyethyl-O-(methyl-bis-trimethylsiloxy-3-propyl)silyl carbamate, silicone-containing vinyl carbonate or vinyl carbamate monomers (e.g., 1,3-bis[4-vinyloxycarbonyloxy)but-1-yl] tetramethyl-disiloxane; 3-(trimethylsilyl), propyl vinyl carbonate, 3-(vinyloxycarbonylthio) propyl-[tris(trimethylsiloxy)silane], 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, t-butyldimethylsiloxyethyl vinyl carbonate; trimethylsilylethyl vinyl carbonate, and trimethylsilylmethyl vinyl carbonate).

Any known suitable siloxane-containing monomers or macromers with two or more ethylenically unsaturated groups can be used in the composition for preparing the intermediate copolymer. Preferred examples of such monomers or macromers are dimethacrylated or diacrylated polydimethylsiloxanes of various molecular weight; vinyl terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane;
polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing monomers or macromers; siloxane-containing macromers disclosed in U.S. Pat. No. 6,762,264 (here incorporated by reference in its entirety); siloxane containing macromer disclosed in U.S. Pat. No. 5,416,132 (here incorporated by reference in its entirety).

Alternatively, di- or multi-ethylenically functionalized polysiloxanes can be obtained by ethylenically functionalizing of a di- or multi-functionalized polysiloxanes (i.e., with two or more terminal functional groups, such as, e.g., —NH$_2$, —OH, —COOH, epoxy groups, etc.) as described above. Suitable di- or multi-functionalized polysiloxanes are commercially available, e.g., from Aldrich, ABCR GmbH & Co., Fluorochem, or Gelest, Inc, Morrisville, Pa.

Nearly any hydrophilic vinylic monomer can be used in the actinically polymerizable composition for preparing the intermediary copolymer with pendant or terminal functional groups. Suitable hydrophilic vinylic monomers are, without this being an exhaustive list, hydroxyl-substituted hydroxyl-substituted $C_1$-$C_8$ alkylacrylates and methacrylates, acrylamide, methacrylamide, $C_1$-$C_8$ alkylacrylamides, $C_1$-$C_8$ alkylmethacrylamides, ethoxylated acrylates, ethoxylated methacrylates, hydroxyl-substituted $C_1$-$C_8$ alkylacrylamides, hydroxyl-substituted $C_1$-$C_8$ alkylmethacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol, N-vinyl alkylamide, N-vinyl-N-alkylamide, and the like.

Among the preferred hydrophilic vinylic monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, and N-vinyl caprolactam.

Nearly any hydrophobic vinylic monomer can be used in the polymerizable composition for preparing the intermediary copolymer. Suitable hydrophobic vinylic monomers include, without limitation, $C_1$-$C_{18}$-alkylacrylates and -methacrylates, $C_3$-$C_{18}$ alkylacrylamides and -methacrylamides, $C_5$-$C_{20}$-cycloalkylacrylates and methacrylates, acrylonitrile, methacrylonitrile, vinyl-$C_1$-$C_{18}$-alkanoates, $C_2$-$C_{18}$-alkenes, $C_2$-$C_{18}$-halo-alkenes, styrene, $C_1$-$C_6$-alkylstyrene, vinylalkylethers in which the alkyl moiety has 1 to 6 carbon atoms, $C_2$-$C_{20}$-perfluoralkyl-acrylates and -methacrylates or correspondingly partially fluorinated acrylates and methacrylates, $C_3$-$C_{12}$-perfluoralkyl-ethyl-thiocarbonylaminoethyl-acrylates and -methacrylates, N-vinylcarbazole, $C_1$-$C_{12}$-alkylesters of maleic acid, fumaric acid, itaconic acid, mesaconic acid and the like. Preference is given e.g. to $C_1$-$C_4$-alkylesters of vinylically unsaturated carboxylic acids with 3 to 5 carbon atoms or vinylesters of carboxylic acids with up to 5 carbon atoms. Examples of some fluorine containing monomers are as follows: perfluorocyclohexylmethyl methacrylate, 2-(N-butylperfluorooctanesulfamido) ethyl acrylate, 1H,1H,7H-dodecafluoroheptyl acrylate, trihydroperfluoroheptyl acrylate, 1H,1H,7H-dodecafluoroheptyl methacrylate, trihydroperfluoroheptyl methacrylate, 1H,1H,11H-eicosafluoroundecyl acrylate, 1H,1H,2H,2H-heptadecafluorodecyl acrylate, 1H,1H,2H,2H-heptadecafluorodecyl methacrylate, tetrahydroperfluorodecyl acrylate, tetrahydroperfluorodecyl methacrylate, 1H,1H-heptafluorobutylacrylamide, 1H,1H-heptafluorobutyl acrylate, 1H,1H-heptafluorobutylmethacrylamide, 1H,1H-heptafluoro-n-butyl methacrylate, 1H,1H,9H-hexadecafluorononyl acrylate, 1H,1H,9H-hexadecafluorononyl methacrylate, 2,2,3,4,4,4-hexafluorobutyl acrylate, hexafluoroisopropyl acrylate, 1H,1H,5H-octafluoropentyl acrylate, 1H,1H,5H-octafluoropentyl methacrylate, pentafluorobenzyl acrylate, pentafluorobenzyl methacrylate, pentafluorophenyl acrylate, pentafluorophenyl methacrylate, 2,2,3,3,3-pentafluoropropyl acrylate, perfluorocyclohexyl methyl acrylate, perfluorooctyl acrylate, 1H,1H-perfluorooctyl acrylate, 1H,1H-perfluorooctyl methacrylate, 2,2,3,3-tetrafluoropropyl acrylate, 2,2,3,3-tetrafluoropropyl methacrylate, 2,2,2-trifluoroethyl methacrylate, hexafluoroisopropyl urethane of isocyanatoethyl methacrylate.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, silicone-containing vinylic monomers, 3-methacryloxypropyl-pentamethyl-disiloxane and bis(methacryloxypropyl)-tetramethyldisiloxane.

The functional chain transfer agent is used to control the molecular weight of the resulting copolymer and/or to provide functional group for subsequent ethylenical functionalization of the resultant intermediary copolymer. The chain transfer agent may comprise one or more thiol groups, for example, two or most preferably one thiol group. Suitable chain transfer agents include organic primary thiols or mercaptans having a further functional group such as, for example, hydroxy, amino, carboxy or a suitable derivative thereof. The chain transfer agent may be present in the polymerizable composition for making an intermediary copolymer in an amount of, for example, from 0.5 to 5%, preferably from 1 to 4%, and in particular from 1.5 to 3.5% by weight, relative to the combined weight of all of polymerizable components. 2-Mercaptoethanol can used in the preparation of copolymers and be present at about 0.25%.

Examples of silicone-free crosslinkers include without limitation tetraethyleneglycol dimethacrylate (TEGDMA), triethyleneglycol dimethacrylate (TrEGDMA), ethylenegly- col dimethacylate (EGDMA), diethylene glycol dimethacry- late, polyethylene glycol dimethacrylate, trimethylopropane trimethacrylate, pentaerythritol tetramenthacrylate, bisphe- nol A dimethacrylate, vinyl methacrylate, ethylenediamine dimethyacrylamide, glycerol dimethacrylate, triallyl isocya- nurate, triallyl cyamurate, triallyl trimeliate, allylmethacry- late, and combinations thereof.

Any know suitable vinylic monomer containing at least one functional group can be used in the polymerizable com- position for preparing the intermediary copolymer. Preferred examples of such vinylic monomers includes methacrylic acid (MAA), acrylic acid, glycidylmethacrylate, glycidy- lacrylate, HEMA, HEA, methacrylic anhydride, tert-buty- laminoethylmethacrylate (or its hydrochloride salt), amino- propyl methacrylate (or its hydrochloride salt), N-hydroxymethylacrylamide (NHMA), 2-bromoethyl- methacrylate, and vinylbenzylchloride.

It should be understood that a vinylic monomer can be used both as a hydrophilic vinylic monomer and as a functionaliz- ing vinylic monomer in the polymerizable composition for preparing the intermediary copolymer. Preferably, the hydro- philic vinylic monomer is devoid of functional groups (e.g., DMA, NVP) and the composition comprises a chain transfer agent with a functional group.

The polymerizable composition for preparing an interme- diary copolymer can be a melt, a solventless liquid in which all necessary components are blended together preferably in the presence of one or more blending vinylic monomers, or a solution in which all necessary component is dissolved in an inert solvent (i.e., should not interfere with the reaction between the reactants in the mixture), such as water, an organic solvent, or mixture thereof, as known to a person skilled in the art. Examples of solvents are described above.

The one or more blending vinylic monomers are in an amount sufficient to dissolve both hydrophilic and hydropho- bic components of the actinically polymerizable composi- tion. A "blending vinylic monomer" refers to a vinylic mono- mer which can function both as a solvent to dissolve both hydrophilic and hydrophobic components of an actinically polymerizable composition and as one of polymerizable components to be polymerized to form a silicone hydrogel material. Preferably, the blending vinylic monomer is present in the actinically polymerizable composition in an amount of from about 5% to about 30% by weight.

Any suitable vinylic monomers, capable of dissolving both hydrophilic and hydrophobic components of a polymerizable composition of the invention to form a solution, can be used in the invention. Preferred examples of blending vinylic monomers include, without limitation, aromatic vinylic monomers, cycloalkyl-containing vinylic monomers. Those preferred blending monomers can increase the predominant glass transition temperature of a silicone hydrogel material prepared by curing a polymerizable composition containing those preferred blending monomer. If the glass transition temperature of the predominant phase of the silicone hydro- gel copolymer is sufficiently high, one could lathe cut contact lenses from polymer slugs or bonnets.

Examples of preferred aromatic vinylic monomers include styrene, 2,4,6-trimethylstyrene (TMS), t-butyl styrene (TBS), 2,3,4,5,6-pentafluorostyrene, benzylmethacrylate, divinylbenzene, and 2-vinylnaphthalene. Of these mono- mers, a styrene-containing monomer is preferred. A styrene- containing monomer is defined herein to be a monomer that contains a vinyl group bonded directly to a phenyl group in which the phenyl group can be substituted by other than a fused ring, e.g., as above with one to three $C_1$-$C_6$ alkyl groups. Styrene itself [$H_2C$=$CH$—$C_6H_5$] is a particularly preferred styrene-containing monomer.

A cycloalkyl-containing vinylic monomer is defined herein to be a vinylic monomer containing a cycloalkyl which can be substituted by up to three $C_1$-$C_6$ alkyl groups. Pre- ferred cycloalkyl-containing vinylic monomers include, without limitation, acrylates and methacrylates each com- prising a cyclopentyl or cyclohexyl or cycloheptyl, which can be substituted by up to 3 $C_1$-$C_6$ alkyl groups. Examples of preferred cycloalkyl-containing vinylic monomers include isobornylmethacrylate, isobornylacrylate, cyclohexyl- methacrylate, cyclohexylacrylate, cyclohexylmethyl meth- acrylate, cyclohexylmethyl acrylate, cyclohexylmethacry- late, cyclohexylacrylate, and the like.

The copolymerization of a polymerizable composition for preparing an intermediary copolymer is induced thermally to preserve latent UV-AFRG moieties. Suitable thermal poly- merization initiators are known to the skilled artisan and comprise, for example peroxides, hydroperoxides, azo-bis (alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydro- peroxide, azo-bis(isobutyronitrile) (AIBN), 1,1-azodiisobu- tyramidine, 1,1'-azo-bis(1-cyclohexanecarbonitrile), 2,2'- azo-bis(2,4-dimethylvaleronitrile) and the like. The polymerization is carried out conveniently in an above-men- tioned solvent at elevated temperature, for example at a tem- perature of from 25 to 100° C. and preferably 40 to 80° C. The reaction time may vary within wide limits, but is conve- niently, for example, from 1 to 24 hours or preferably from 2 to 12 hours. It is advantageous to previously degas the com- ponents and solvents used in the polymerization reaction and to carry out said copolymerization reaction under an inert atmosphere, for example under a nitrogen or argon atmo- sphere.

Preferably, the polymerizable composition for preparing an intermediary copolymer comprises at least one siloxane- containing vinylic monomer.

More preferably, an intermediary copolymer of the inven- tion comprises: from about 15% to about 70% by weight, preferably from about 25% to about 60%, of siloxane units derived from one or more siloxane-containing monomers and/or one or more siloxane-containing macromers; from about 10% to about 60%, preferably from about 15% to 45% by weight, of hydrophilic units derived from one or more hydrophilic monomers and/or one or more hydrophilic mac- romers; from 0 to about 50%, preferably from about 5% to about 30% of silicone-containing units derived from one or more silicone-containing vinylic monomers; and about 1% to about 15%, preferably from about 2% to about 10% by weight, of at least one vinylic monomer of formula (II) or (III) above.

In accordance with the invention, ethylenically functional- izing of the intermediary copolymer can be carried out by covalently attaching ethylenically unsaturated groups to the functional groups (e.g., amine, hydroxyl, carboxyl, isocyan- ate, epoxy groups) of the intermediary copolymer. Any vinylic monomer having a hydroxy, amino, carboxyl, epoxy, acid-chloride, isocyanate group, which is coreactive with iso- cyanate, amine, hydroxyl, carboxy, or epoxy groups of an intermediary copolymer in the absence or presence of a cou- pling agent (such as, e.g., EDC, diisocyanate, or diacid chlo- ride), can be used in ethylenically functionalizing the intermediary copolymer. Examples of such vinylic monomers include, without limitation, for reacting with terminal hydroxy groups, 2-isocyanatoethyl methacrylate, methacrylic anhydride, 3-isopropenyl-alpha, alpha-dimethylbenzyl isocyanate, acryloyl chloride, or methacryloyl chloride, glycidyl methacrylate; for reacting with terminal amine groups, 2-isocyanatoethyl methacrylate, 3-isopropenyl-alpha, alpha-dimethyl benzyl isocyanate, methacrylic anhydride, acrylic acid, methacrylic acid, acryloyl chloride, or methacryloyl chloride; for reacting with terminal carboxy groups in the presence of EDC, vinylamine, 2-tertbutylaminoethylmethacrylate, 2-aminoethyl methacrylate or 3-aminopropyl methacrylamide. The above list is not exhaustive but illustrative. A person skilled in the art will know how to select a vinylic monomer with a functional group to functionalize ethylenically intermediary copolymers.

Preferably, the prepolymers used in the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

In another aspect, the invention provides a soft contact lens. The soft contact lens of the invention comprises: a silicone hydrogel material that is obtained by curing a lens-forming material in a mold, wherein the lens-forming material comprises an actinically crosslinkable prepolymer and at least one hydrophilic vinylic monomer, wherein the prepolymer comprises (1) siloxane units derived from one or more siloxane-containing vinylic monomers and/or one or more siloxane-containing macromers; (2) hydrophilic units derived from one or more hydrophilic vinylic monomers and/or one or more hydrophilic macromers; (3) chain-extending units having latent UV-AFRG moieties; and (4) actinically-crosslinkable groups, wherein the silicone hydrogel material includes dangling hydrophilic polymer chains each of which is formed from the at least one hydrophilic vinylic monomer and covalently attached to the polymer matrix of the silicone hydrogel material through one of the chain-extending units, wherein the formed soft contact lens has a hydrophilic surface without post-curing surface treatment.

In accordance with the invention, a lens-forming material is a fluid composition, which can be a solution or a melt at a temperature from about 20° C. to about 85° C. Preferably, a lens-forming material is a solution of at least one prepolymer of the invention, at least one hydrophilic vinylic monomer, and other desirable components in water, or an organic solvent, or a mixture of water and one or more organic solvents.

A solution of at least one prepolymer and at least one vinylic monomer can be prepared by dissolving the prepolymer, the hydrophilic vinylic monomer, and other components in any suitable solvent known to a person skilled in the art. Examples of suitable solvents are described above.

All of the various embodiments of the prepolymer of the invention and hydrophilic vinylic monomers described above can be used in this aspect of the invention.

It must be understood that a lens-forming material can also comprise various components, such as, for example, silicone-containing vinylic monomers, hydrophobic vinylic monomers, polymerization initiators (e.g., photoinitiator or thermal initiator), a visibility tinting agent (e.g., dyes, pigments, or mixtures thereof), UV-blocking (absorbing) agent, photosensitizers, inhibitors, antimicrobial agents (e.g., preferably silver nanoparticles or stabilized silver nanoparticles), bioactive agent, leachable lubricants, fillers, and the like, as known to a person skilled in the art.

All of the various embodiments of silicone-containing vinylic monomers and hydrophobic vinylic monomers described above can be used in this aspect of the invention.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocure and Irgacure types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronile (AIBN) or 2,2-azobis(2,4-dimethylvaleronitrile) (VAZO-52).

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials and non-crosslinkable hydrophilic polymers (i.e., without ethylenically unsaturated groups). Exemplary mucin-like materials include without limitation polyglycolic acid, polylactides, collagen, hyaluronic acid, and gelatin.

Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N-N-di methylacrylamide, polyacrylic acid, poly(2-ethyl oxazoline), heparin polysaccharides, polysaccharides, and mixtures thereof.

The number-average molecular weight $M_n$ of the non-crosslinkable hydrophilic polymer is preferably from 20,000 to 500,000, more preferably from 30,000 to 100,000, even more preferably from 35,000 to 70,000.

In accordance with the invention, the lens-forming material can be introduced (dispensed) into a cavity formed by a mold according to any known methods.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711 to Schad; 4,460,534 to Boehm et al.; 5,843,346 to Morrill; and 5,894,002 to Boneberger et al., which are also incorporated herein by reference.

Virtually all materials known in the art for making molds can be used to make molds for preparing ocular lenses. For example, polymeric materials, such as polyethylene, polypropylene, polystyrene, PMMA, cyclic olefin copolymers (e.g., Topas® COC from Ticona GmbH of Frankfurt, Germany and Summit, N.J.; Zeonex® and Zeonor® from Zeon Chemicals LP, Louisville, Ky.), or the like can be used. Other materials that allow UV light transmission could be used, such as quartz glass and sapphire.

In a preferred embodiment, reusable molds can be used. Examples of reusable molds made of quartz or glass are those disclosed in U.S. Pat. No. 6,627,124, which is incorporated by reference in their entireties. In this aspect, the lens-forming material is poured into a mold consisting of two mold halves, the two mold halves not touching each other but having a thin gap of annular design arranged between them. The gap is connected to the mold cavity, so that excess lens-forming material can flow into the gap. Instead of polypropylene molds that can be used only once, it is possible for reusable quartz, glass, sapphire molds to be used, since, following the production of a lens, these molds can be cleaned rapidly and effectively to remove unreacted materials and other residues, using water or a suitable solvent, and can be dried with air. Reusable molds can also be made of a cyclic olefin copolymer, such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced and high fidelity to the lens design.

After the lens-forming material is dispensed into the mold, it is polymerized to produce a contact lens. Crosslinking may be initiated in the mold e.g. by means of actinic radiation, such as UV irradiation, preferably by means of a spatial limitation of actinic radiation to crosslink the lens-forming material. One could also produce various shaped parts from lens formulation (e.g. polymer bonnets, or polymer buttons) and then lathe cut the parts to form contact lenses.

The crosslinking according to the invention may be effected in a very short time, e.g. in ≦60 minutes, advantageously in ≦20 minutes, preferably in ≦10 minutes, most preferably in ≦5 minutes, particularly preferably in 1 to 60 seconds and most particularly in 1 to 30 seconds.

Opening of the mold so that the molded article can be removed from the mold may take place in a manner known per se.

Although this invention describes UV-curing of lens formulations, one could employ any number of combinations of thermal and UV-curing to obtain silicone hydrogel lenses with covalently linked internal wetting agents. This could be accomplished by adding thermal initiators (e.g. AIBN, VAZO-52, benzoyl peroxide) to lens formulations. Lens formulations could be heated for a determined period of time and then irradiated with UV-light. Alternatively one could simultaneously heat and UV-irradiate lens formulations. In yet another variation, one could first irradiate lens formulations for some period of time and then heat in the absence of UV-light.

Chain length of the wetting agents on the silicone hydrogel can be controlled or limited by the use of chain transfer agents (e.g. mercaptans, solvents), ratio of monomer to UV-AFRG moiety, and temperature.

The molded contact lenses can further subject to further processes, such as, for example, surface treatment, sterilization, and the like.

A contact lens of the invention has an oxygen permeability of preferably at least about 35 barrers, more preferably at least about 45 barrers, even more preferably at least about 60 barrers. In accordance with the invention, an oxygen permeability is an apparent (directly measured when testing a sample with a thickness of about 100 microns) oxygen permeability according to procedures described in Examples.

A contact lens of the invention has an elastic modulus of from about 0.2 MPa to about 2.0 MPa, preferably from about 0.25 MPa to about 1.5 MPa, more preferably from 0.3 MPa to about 1.2, even more preferably from about 0.4 MPa to about 1.0 MPa.

A contact lens of the invention further has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A contact lens of the invention further has a water content of preferably from about 15% to about 60%, more preferably from about 20% to about 50% by weight when fully hydrated. The water content of a silicone hydrogel contact lens can be measured according to Bulk Technique as disclosed in U.S. Pat. No. 5,849,811.

In a further aspect, the invention provides a method for producing soft contact lenses. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises one or more actinically crosslinkable prepolymers and at least one hydrophilic vinylic monomer, wherein each of said one or more prepolymers comprises (1) siloxane units derived from one or more siloxane-containing vinylic monomers and/or one or more siloxane-containing macromers; (2) hydrophilic units derived from one or more hydrophilic vinylic monomers and/or one or more hydrophilic macromers; (3) chain-extending units having latent UV-AFRG moieties; and (4) ethylenically unsaturated groups; and actinically irradiating the composition in the mold to crosslink said lens-forming material to form a silicone hydrogel material, wherein the silicone hydrogel material includes dangling hydrophilic polymer chains each of which is formed from the at least one hydrophilic vinylic monomer and covalently attached to the polymer matrix of the silicone hydrogel material through one of the chain-extending units, wherein the formed soft contact lens has a hydrophilic surface without post-curing surface treatment.

It is understood that the polymerization of the lens formulation can be initiated thermally in the mold to form a lens. Then, the resultant lens with latent UV-AFRG moieties can be brought in contact with a solution of hydrophilic vinylic monomer and irradiated with UV light to render the lens surface hydrophilic.

All of the various embodiments of the prepolymer, hydrophilic vinylic monomers, lens-forming materials, and contact lens of the invention described above can be used in this aspect of the invention.

In a still further aspect, the invention provides a vinylic monomer having a phenone moiety. Preferably, the vinylic monomer with a phenone moiety is defined by formula (II) or (III) above.

Vinylic monomer of formula (II) or (III) can be prepared by ethylenically functionalizing a phenone-containing compound based on a coupling reaction described above and known to a person skilled in the art. Exemplary preparations of several preferred vinylic monomers of formula (II) or (III) are shown in the following schemes.

Scheme 1

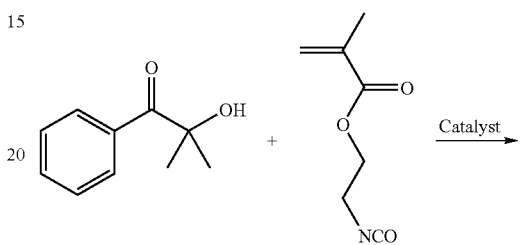

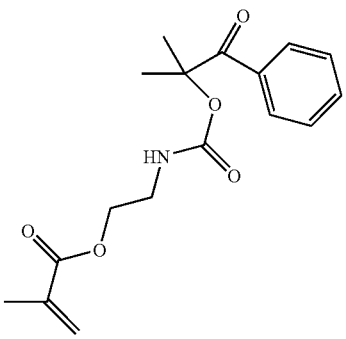

Scheme 2

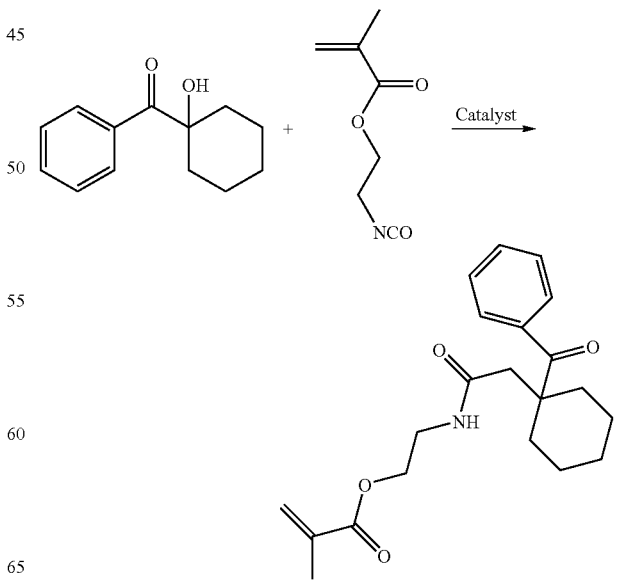

Scheme 3

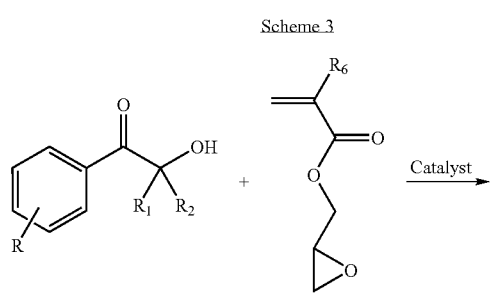
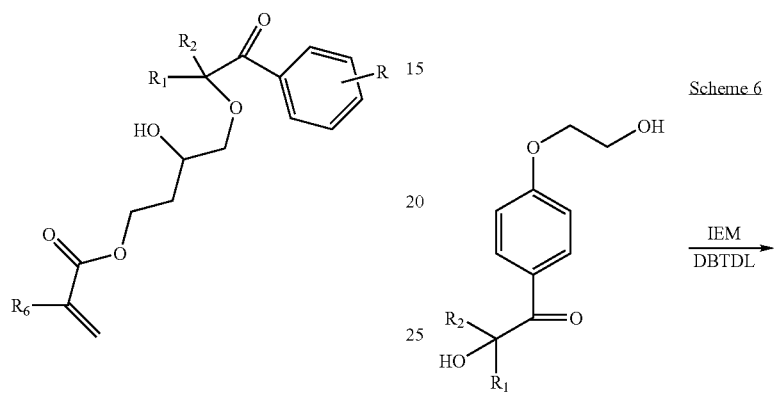

Scheme 4

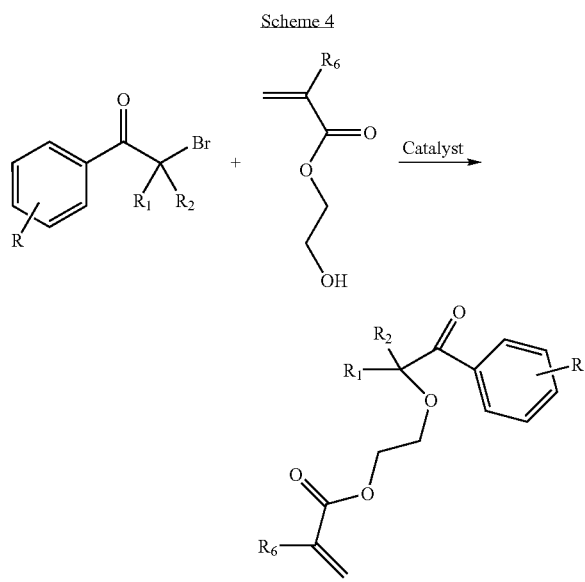

Scheme 5

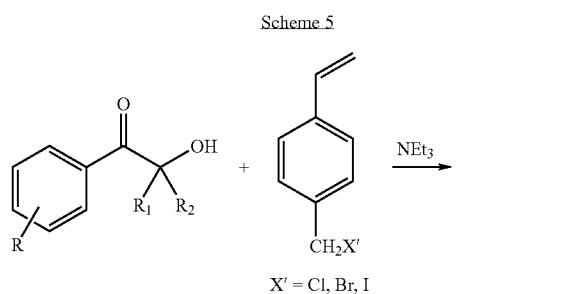
X' = Cl, Br, I

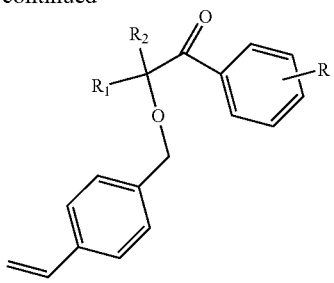

Scheme 6

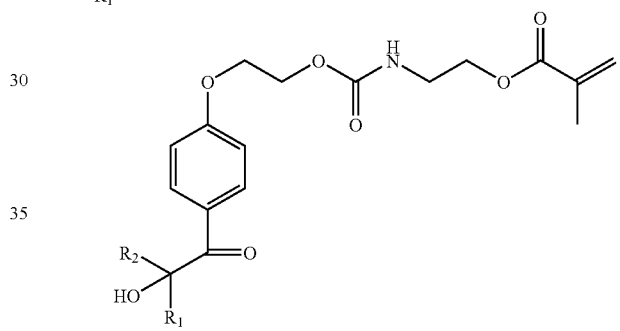

in which R, $R_1$, and $R_2$ are as defined above.

A vinylic monomer of formula (II) or (III) can be used to prepare comb structured polymers and copolymers (random or block) by a two-step polymerization process. First, the vinylic monomer of formula (II) or (III) is copolymerized thermally with one or more vinylic monomers (without latent UV-AFRG moities to form a polymer chain having latent UV-AFRG moieties. Second, polymerization of one or more hydrophilic vinylic monomers (e.g., vinylpyrrolidone, HEMA, HEA, DMA, etc) in the presence of the polymer chain having UV-AFRG moieties is initiated by UV irradiation to form side hydrophilic chains extending from the units derived of vinylic monomer of formula (II) or (III).

Prepolymers, intermediary copolymer, and vinylic monomers of formula (II) or (III) can be used as coating materials or in inks for making colored contact lenses. In the case of inks, colorants are added to the mixture of copolymer, solvent and monomer. Colored contact lenses are produced for example by printing base curve molds, UV-curing the inks, filling front curve molds with lens formulation, closing the mold assemblies and curing the lens formulations. Alternatively one could print a pattern directly on a lens (molded or lath cut) and then UV-cure the ink to produce a colored contact lens. Any number of printing technologies such as pad printing, ink jet, and screen printing could be used. Upon UV-irradiation, the latent radical generating groups trigger cross-linking reactions and hydrophilic chain growth of the ink or lens formulation. Since the silicone hydrogel contains pendent phenone moieties, addition of photoinitiator to ink or lens formulations can be omitted if desired.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

Water contact angle on a contact lens is a general measure of the surface hydrophilicity (or wetability) of the contact lens. In particular, a low water contact angle corresponds to more hydrophilic surface. Average contact angles (advancing) of contact lenses are measured using sessile drop method.

The slippery/wetting test is determined as follows. Silicone hydrogel lenses with hydrophobic surfaces tend to stick to glass surfaces (e.g. glass vial) whereas lenses with good wettability tend to slide easily over glass surfaces. The relative slipperiness of lenses is assigned based on their ease of going in and out of glass vials containing de-ionized water.

The oxygen permeability of a lens and oxygen transmissibility of a lens material is determined using polargraphic method.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.

Example 2

Preparation of Vinylic Monomer of Formula (II)
(Compound I) According to Scheme 2

2-isocyanatoethyl methacrylate (7.783 grams) containing 0.224 grams of dibutyltindilaurate is added to a solution of consisting of 10.145 grams of 1-hydroxycyclohexylphenylketone, 23.5 mg of 4-hydroxy-TEMPO and about 30 mL of ethyl acetate. The mixture is heated at 40-45° C. in a water bath and the progress of the reaction is monitored by FT-IR spectroscopy. After about 3 days, FT-IR shows that an IR band from isocyanate is no longer present. The reaction vessel is removed from the heating bath and solvent is stripped by rotary evaporation. The resulting solid is recrystallized from methanol. The crystals are washed with hexane and dried to yield 12.483 grams of compound I. UV-VIS analysis of the sample in methanol shows peaks or shoulders near 320 nm, 280 nm and 250 nm. The peak near 320 nm is easily observed in relatively concentrated solution (~9×10$^{-4}$ g/mL. FT-IR analysis of the solid (film cast from chloroform) shows peaks at 3375, 3060, 2938, 2861, 1720, 1637, 1531, 1448, 1320, 1294, 1157, 1040, 974, and 822 cm$^{-1}$. DSC: The crystalline solid is analyzed by differential scanning calorimetry (DSC) by heating at 10° C./min. DSC analysis shows the onset of melting at about 65° C. and melting peak centered at 74° C. Upon continued heating beyond the melting transition, an exothermic peak characteristic of polymerization is observed between about 175° C. to 225° C.

Example 3

Preparation of Compound II According to Scheme 1

2-isocyanatoethyl methacrylate (9.411 grams) containing 0.2379 grams of dibutyltindilaurate is added to a solution consisting of 10.037 grams 2-hydroxy-2-methyl-1-phenyl-propan-1-one and 22.7 mg of 4-hyroxy-TEMPO. The resulting solution is mixed and then immersed in a bath and heated at about 45° C. The progress of the reaction is followed by monitoring the consumption of isocyanate by FT-IR spectroscopy. The reaction mixture is noticeably more viscous after about 2 hours, but still showing the presence of isocyanate. Within 24 hours the reaction mixture solidifies. A few milligrams of the solid are dissolved in about 0.5 mL of chloroform and a film is cast on a NaCl disk. The film is dried and analyzed and isocyanate is not detected, indicating that the reaction is complete. The solid reaction product is recrystallized from isopropanol. The white crystals are filtered from the isopropanol, washed with cold hexane and then vacuum dried to yield a total of 14.701 grams of product. UV-VIS analysis of the sample in methanol shows peaks or shoulders near 320 nm, 280 nm and 245 nm. The peak near 320 nm is easily observed in relatively concentrated solution (~9×10$^{-4}$ g/mL. FT-IR analysis of the solid (film cast from chloroform) showed peaks at 3365, 3065, 2996, 2944, 1712, 1632, 1533, 1447, 1382, 1321, 1294, 1173, 1130, and 984 cm-1. The crystalline solid is analyzed by Differential scanning calorimetry (DSC) by heating the sample at 10° C./min. The DSC trace shows the onset of melting at about 104° C. and melting peak centered at 107° C. Upon continued heating beyond the melting transition, an exothermic peak characteristic of polymerization is observed. Upon repeated heat cycling, the exothermic peak diminished and a glass transition near 63° C. is observed.

Example 4

Preparation of Compound II According to Scheme 2

2-isocyanatoethyl methacrylate (9.411 grams) containing 0.2251 grams of dibutyltin dilaurate is added to a solution consisting of 10.017 grams 2-hydroxy-2-methyl-1-phenyl-propan-1-one and 31.5 mg of 4-hyroxy-TEMPO. The resulting solution is mixed and allowed to react at room temperature (22 deg-C). The progress of the reaction is checked by monitoring an isocyanate band by FT-IR. Within 24 hours the reaction mixture solidifies. A few milligrams of the solid are dissolved in about 0.5 mL of chloroform and a film is cast on a NaCl disk. The film is dried and checked by FT-IR and does not show the presence of isocyanate. The solid reaction product is recrystallized from isopropanol. White crystals are filtered from the isopropanol, washed with hexanes and then dried to yield a total of 13.701 grams of product. Several mg of the crystalline material are dissolved in about 1 mL of chloroform and a film is cast on NaCl and dried. FT-IR analysis of the sample matches that in Example 3 above. UV-VIS analysis of the sample in dilute methanol (~8×10$^{-5}$ g/mL) shows peaks or shoulders near 280 nm and 245 nm. The crystalline sample is analyzed by DSC by heating at 10° C./min to 140° C. The thermogram shows the onset of melting near 104° C. with a melting peak centered near 107° C. After cooling and reheating (second DSC scan) transitions characteristic of crystallization and melting are observed. Repeated heating in the DSC cell up to about 200° C. shows exothermic peaks characteristic of polymerization and the development of a glass transition temperature near about 66° C.

Example 5

Preparation of Silicone-Containing Copolymer with Latent UV-AFRG Moieties

A one liter jacketed glass kettle equipped with nitrogen inlet/outlet, condenser, and a stirring unit is charged with DMA (82.79 grams), TRIS (80.14 grams), HEMA (25.09 grams), polydimethylsiloxanemonomethacrylate-MCR-M17 (50.50 grams), VAZO-52 (1.4317 grams), 2-mercaptoethanol (0.7045 grams), compound II (3.0285 grams) (prepared in Example 3 or 4) and ethyl acetate (500 mL). The materials are mixed until homogenous. The mixture is sparged with nitrogen for about 30 minutes at about 100 mL/min. The nitrogen flow is decreased, stirring speed is adjusted to about 250 RPM, and the reaction mixture is heated to about 50° C. for about 24 hours. After about 24 hours, the reaction mixture is noticeably more viscous than at the start of the polymerization. The intermediary copolymer solution is inhibited with about 17 mg of 4-hydroxy-TEMPO dissolved in about 10 mL of ethyl acetate. A solution consisting of about 0.2092 grams of dibutyltindilaurate and 4.5245 grams of 2-isocyanatoethylmethacrylate is added to the intermediary copolymer solution and the resulting mixture is heated at about 40° C. for about 4 hours. Ethylacetate is removed by rotary evaporation. After the ethyl acetate is no longer observed to be evaporating, the sample is diluted with about 500 mL of ethanol and solvent evaporation operations are continued. The prepolymer sample is diluted with ethanol followed by rotary evaporation two more times. The sample is concentrated to about a 66% concentration.

Example 6

Preparation of Lens Formulations. Several Lens Formulations (Clear Solutions) are Prepared by dissolving and mixing prepolymer prepared in Example 5 and other components in ethanol to have compositions shown in Table 1.

Preparation of Contact lenses: Polypropylene lens molds are filled with about 100 microliters of a lens formulation and then the lens formulation in the molds is cured under UVA at about 3.5 mW/cm2 for about 45 minutes. Lenses are stored in molds under laboratory lighting for about 24 hours and then separated and removed from the molds. The lenses are subject to extraction with isopropanol twice each for a 30 minute extraction time. The lenses are hydrated twice by immersing them in de-ionized water for 30 minutes.

Lenses are characterized and the properties are reported in Table 2.

TABLE 1

| Components | Formulation (Wt %) | | | | |
|---|---|---|---|---|---|
| | I | II | III | IV | V (control) |
| Prepolymer | 53.19 | 52.97 | 52.80 | 52.93 | 53.52 |
| DMA | 9.98 | 15.08 | 0.00 | 0.00 | 0.00 |
| NVP | 0.00 | 0.00 | 10.40 | 14.99 | 0.00 |
| Ethanol | 36.97 | 31.96 | 36.80 | 32.07 | 46.48 |
| Total | 100.00 | 100.00 | 100.00 | 100.00 | 100.00 |

| Properties | Lens Properties | | | | |
|---|---|---|---|---|---|
| | I | II | III | IV | V (control) |
| Diameter (mm) (std dev) | 14.23 ± 0.06 | 15.57 ± 0.34 | 12.95 ± 0.09 | 13.35 ± 0.03 | 11.60 ± 0.17 |
| % Water | 46.73 | 53.78 | 37.95 | 39.96 | 31.33 |
| Apparent Dk (Barrer)[#] | 39 | 38 | 45 | 34 | 48 |
| Ion Permeability | 21 | 27 | 11 | 13 | 5 |
| % T (at 600 nm) | 99.3 ± 0.4 | 100.3 ± 0.3 | 99.8 ± 0.2 | 100.2 ± 0.1 | 100.0 ± 0.1 |
| Slippery/wetting test* | 2 | 5 | 3 | 4 | 1 |
| Modulus (N/mm2) | 0.47 ± 0.06 | 0.56 ± 0.05 | 0.54 ± 0.03 | 0.53 ± 0.03 | 0.37 ± 0.04 |
| Elongation at break (%) | 138 ± 21 | 92 ± 18 | 101 ± 39 | 120 ± 23 | 107 ± 49 |
| Break Stress (N/mm$^2$) (std dev) | 0.48 ± 0.11 | 0.56 ± 0.14 | 0.43 ± 0.29 | 0.59 ± 0.14 | 0.43 ± 0.29 |

*Relative ranking (1 to 5): 5 = most slippery and wetting; and 1 = least slippery and wetting
[#]Dk measured by polarographic method.
All tensile testing are carried out with 10 lenses (N = 10).
A significant increase in ion permeability is observed for lenses formulations containing added hydrophilic monomer (e.g. DMA, NVP) as compared to control.

Example 7

Preparation of Silicone-Containing Copolymer with Latent UV-AFRG Moieties

A one liter jacketed glass kettle equipped with nitrogen inlet/outlet, condenser, and a stirring unit is charged with DMA (17.59 grams), TRIS (123.15 grams), HEMA (12.55 grams), polydimethylsiloxanemonomethacrylate-MCR-M17 (87.58 grams), VAZO-52 (1.4476 grams), 2-mercaptoethanol (0.7320 grams), compound II (3.0565 grams) (prepared in Example 3 or 4) and ethyl acetate (500 mL). The materials are mixed until homogenous. The mixture is sparged with nitrogen for about 30 minutes at about 150 mL/min. The nitrogen flow is decreased, stirring speed is adjusted to about 250 RPM, and the reaction mixture is heated to about 50° C. for about 24 hours. The intermediary copolymer solution is inhibited with about 22 mg of 4-hydroxy-TEMPO dissolved in about 10 mL of ethyl acetate. A solution consisting of about 0.2383 grams of dibutyltindilaurate and 4.4986 grams of 2-isocyanatoethylmethacrylate is added to the intermediary copolymer solution and the resulting mixture is heated at about 40° C. for about 4 hours. Ethyl acetate is removed by rotary evaporation. After the ethyl acetate is no longer observed to be evaporating, the sample is diluted with about 600 mL of ethanol and solvent evaporation operations are continued. The prepolymer sample is diluted with ethanol followed by rotary evaporation two more times. The sample is concentrated to about a 86% concentration.

Example 8

Preparation of Silicone-Containing Copolymer with Latent UV-AFRG Moieties

A one liter jacketed glass kettle equipped with nitrogen inlet/outlet, condenser, and a stirring unit is charged with DMA (37.57 grams), TRIS (120.06 grams), HEMA (12.57 grams), polydimethylsiloxanemonomethacrylate-MCR-M17 (70.06 grams), VAZO-52 (1.4430 grams), 2-mercaptoethanol (0.7396 grams), compound II (3.0963 grams) (prepared in Example 3 or 4) and ethyl acetate (500 mL). The materials are mixed until homogenous. The mixture is sparged with nitrogen for about 30 minutes at about 100 mL/min. The nitrogen flow is decreased, stirring speed is adjusted to about 250 RPM, and the reaction mixture is heated to about 50° C. for about 24 hours. The intermediary copolymer solution is inhibited with about 23 mg of 4-hydroxy-TEMPO dissolved in about 10 mL of ethyl acetate. A solution consisting of about 0.2430 grams of dibutyltindilaurate and 4.5979 grams of 2-isocyanatoethylmethacrylate is added to the intermediary copolymer solution and the resulting mixture is heated at about 40° C. for about 4 hours. Ethyl acetate is removed by rotary evaporation. After the ethyl acetate is no longer observed to be evaporating, the sample is diluted with about 500 mL of ethanol and solvent evaporation operations are continued. The prepolymer sample is diluted with ethanol followed by rotary evaporation two more times. The sample is concentrated to about a 85% concentration.

Example 9

Preparation of Silicone-Containing Copolymer with Latent UV-AFRG Moieties

A one liter jacketed glass kettle equipped with nitrogen inlet/outlet, condenser, and a stirring unit is charged with DMA (62.50 grams), TRIS (65.80 grams), HEMA (25.15 grams), polydimethylsiloxanemonomethacrylate-MCR-M17 (65.87 grams), VAZO-52 (1.4574 grams), 2-mercaptoethanol (0.7001 grams), compound II (3.0216 grams) (prepared in Example 3 or 4) and ethyl acetate (500 mL). The materials are mixed until homogenous. The mixture is sparged with nitrogen for about 30 minutes at about 100 mL/min. The nitrogen flow is decreased, stirring speed is adjusted to about 300 RPM, and the reaction mixture is heated to about 50° C. for about 24 hours. After about 24 hours, the reaction mixture is noticeably more viscous than at the start of the polymerization. The intermediary copolymer solution is inhibited with about 17 mg of 4-hydroxy-TEMPO dissolved in about 10 mL of ethyl acetate. A solution consisting of about 0.2120 grams of dibutyltindilaurate and 7.5529 grams of 2-isocyanatoethylmethacrylate is added to the intermediary copolymer solution and the resulting mixture is heated at about 40° C. for about 4 hours. Ethyl acetate is removed by rotary evaporation. After the ethyl acetate is no longer observed to be evaporating, the sample is diluted with about 500 mL of ethanol and solvent evaporation operations are continued. The prepolymer sample is diluted with ethanol followed by rotary evaporation two more times.

Example 10

Preparation of Silicone-Containing Copolymer with Latent UV-AFRG Moieties

A one liter jacketed glass kettle equipped with nitrogen inlet/outlet, condenser, and a stirring unit is charged with DMA (80.15 grams), TRIS (62.57 grams), HEMA (25.02), polydimethylsiloxanemonomethacrylate-MCR-M17 (65.80 grams), VAZO-52 (1.4561 grams), 2-mercaptoethanol (0.7072 grams), compound II (3.0756 grams) (prepared in Example 3 or 4) and ethyl acetate (500 mL). The materials are mixed until homogenous. The mixture is sparged with nitrogen for about 30 minutes at about 100 mL/min. The nitrogen flow is decreased, stirring speed is adjusted to about 300 RPM, and the reaction mixture is heated to about 50° C. for about 24 hours. After about 24 hours, the reaction mixture is noticeably more viscous than at the start of the polymerization. The intermediary copolymer solution is inhibited with about 18 mg of 4-hydroxy-TEMPO dissolved in about 10 mL of ethyl acetate. A solution consisting of about 0.2136 grams of dibutyltindilaurate and 7.5124 grams of 2-isocyanatoethylmethacrylate is added to the intermediary copolymer solution and the resulting mixture is heated at about 40° C. for about 4 hours. Ethyl acetate is removed by rotary evaporation. After the ethyl acetate is no longer observed to be evaporating, the sample is diluted with about 500 mL of ethanol and solvent evaporation operations are continued.

The following examples (11 and 12) describe the preparation of a hydrophilic polymer containing Latent UV-AFRG Moieties. The hydrophilic polymers containing latent UV-AFRG moieties might be useful as a wetting agents for contact lenses. The hydrophilic polymers with latent UV-AFRG units could be added to a saline or a lens formulations.

Example 11

Preparation of Silicone-Containing Prepolymer with Latent UV-AFRG Moieties

A one liter jacketed glass kettle equipped with nitrogen inlet/outlet, condenser, and a stirring unit is charged with NVP (242.78 grams), VAZO-52 (1.5056 grams), 2-mercaptoethanol (0.7544 grams), compound II (2.5148 grams) (prepared in Example 3 or 4) and ethanol (500 mL). The materials are mixed until homogenous. The mixture is sparged with nitrogen for about 30 minutes at about 100 mL/min. The nitrogen flow is decreased, the reaction mixture is stirred, and heated to about 50° C. for about 24 hours. After about 24 hours, the reaction mixture is slightly hazy and noticeably more viscous than at the start of the polymerization. The copolymer solution is inhibited with about 15 mg of 4-hydroxy-TEMPO dissolved in about 10 mL of ethyl acetate.

Example 12

Preparation of Silicone-Containing Prepolymer with Latent UV-AFRG Moieties

A one liter jacketed glass kettle equipped with nitrogen inlet/outlet, condenser, and a stirring unit is charged with NVP (239.58 grams), methacrylic acid (3.78 grams), VAZO-52 (1.5095 grams), 2-mercaptoethanol (0.7592 grams), compound II (2.5095 grams) (prepared in Example 3 or 4) and ethanol (500 mL). The materials are mixed until homogenous. The mixture is sparged with nitrogen for about 30 minutes at about 100 mL/min. The nitrogen flow is decreased, the reaction mixture is stirred, and heated to about 50° C. for about 24 hours. After about 24 hours, the reaction mixture is clear and noticeably more viscous than at the start of the polymerization. The copolymer solution is inhibited with about 15 mg of 4-hydroxy-TEMPO dissolved in about 10 mL of ethyl acetate.

Example 13

Preparation of Vinylic-monomer derivative of 4-(2-hydroxyethoxy)phenyl-(2-hydroxy-2-methylpropyl) ketone A glass, jacketed reactor is charged with a solution consisting of 30.010 grams of 4-(2-hydroxyethoxy)phenyl-(2-hydroxy-2-methylpropyl)ketone (Irgacure 2959 from CIBA) dissolved in about 250 mL of warm ethyl acetate. To this mixture is added 0.0234 grams of 4-hydroxy-TEMPO dissolved in about 3 mL of ethyl acetate. The solution is cooled to about 25° C. and then a solution consisting of 20.9301 grams of 2-isocyanatoethyl methacrylate containing 0.4213 grams of dibutyltindilaurate is added. The reaction mixture is then allowed to stir and heat at about 35° C. for about 20 hours. The reaction mixture is then concentrated by rotary evaporation until its mass is about 70 grams and then the final mass of the mixture is adjusted to about 75 grams by adding ethyl acetate. After cooling overnight, white crystals are filtered from the ethyl acetate and washed with 3×50 mL of hexanes. After drying for several minutes on a filter as air passes over the crystals, about 42.77 grams of product is obtained. The product is dissolved in warm isopropanol. Upon cooling, the resulting solution yields glistening white crystals. The crystals are collected, washed with about 3×50 mL of hexanes and air dried to yield about 37.02 grams of product. A second crop of crystals (2.07 grams) is obtained upon chilling the isopropanol solution. The reaction product is further dried under vacuum at room temperature. UV-VIS spectroscopy of the sample in ethanol shows peaks near 275 nm and 215 nm. FT-IR analysis of the crystalline product (film cast from chloroform) shows peaks at about 3442, 3363, 3077, 2960, 2929, 2885, 1724 (shoulder), 1715, 1703, 1666, 1602, 1540, 1509, 1454, 1377, 1302, 1251, 1163, 1067, 956, 837, and 769 cm$^{-1}$. The crystalline solid is analyzed by Differential scanning calorimetry (DSC) by heating the sample at 10° C./min. A DSC trace of the crystalline product shows the onset of melting at about 79° C. and melting peak centered at 82° C. Upon continued heating beyond the melting transition, an exothermic peak characteristic of polymerization is observed. Upon repeated heat cycling, the exothermic peak diminishes and a glass transition near 31° C. is visible.

Example 14

Preparation of Silicone-Containing Copolymer with Latent UV-AFRG Moieties

A copolymer is prepared from solution consisting of DMA (70.02 grams), TRIS (42.39 grams), HEMA (18.15 grams), polydimethylsiloxanemonomethacrylate-MCR-M11 (51.34 grams), VAZO-52 (0.5053 grams), 2-mercaptoethanol (2.0174 grams), compound II (14.0315 grams) (prepared in Example 3 or 4), VAZO-52 (4.0601 grams) and ethyl acetate (600 mL). The polymerization is carried out for about 24 hours under nitrogen at about 50° C. in a 1-liter jacketed glass reaction kettle equipped with stirring and a nitrogen inlet/outlet. Nitrogen is bubbled into the reaction mixture at about 200 mL/minute during polymerization. After about 24 hours of reaction, the copolymer solution is inhibited with about 20 mg of 4-hydroxy-TEMPO dissolved in about 5 mL of ethyl acetate. The polymerization solution is transferred to a tarred jar and then the reaction vessel is rinsed with ethyl acetate. The ethyl acetate rinses are added to the jar containing the polymerization solution and the mass of the solution is adjusted to about 700 grams with ethyl acetate. About 50 mL of copolymer solution is concentrated to a mass of about 21 grams and then mixed with about 500 mL of de-ionized water. The resulting solid is separated from solvents and dissolved in about 25 mL of ethanol and then concentrated by rotary evaporation at about 40° C. About 25 mL portions ethanol are added two more times followed by rotary evaporation. The copolymer solution is concentrated to a mass of about 16.78 grams. About 2.5 grams of the copolymer solution is allowed to evaporate under vacuum. About 20 mg of copolymer is dissolved in chloroform and a film is cast on a NaCl disk and allowed to dry under a stream of nitrogen for a about 1 minute prior to FT-IR analysis. FT-IR shows peaks near: 3405, 2959, 1723, 1643, 1496, 1463, 1399, 1360, 1260, 1201, 1100, 1054, 843, 801, and 757, cm$^{-1}$.

Example 15

Silicone-Containing Copolymer Containing Latent UV-AFRG Moieties: UV Graft Reaction with DMA Copolymer solution from Example 14 above (104.10 grams, about 28.9% copolymer in ethyl acetate) is placed in a plastic beaker and mixed with 7.58 grams of DMA on a stir plate. The beaker is placed in a polyethylene plastic bag and sealed. The copolymer solution containing DMA is irradiated with UVA (intensity about 3.3 mW/cm$^2$) for about 6 hours while being stirred. The intermediary copolymer solution is mixed with 0.0812 grams of dibutyltindilaurate and 0.8485 grams of 2-isocyanatoethylmethacrylate and the resulting mixture is heated at about 40° C. for about 4 hours. Ethyl acetate is removed by rotary evaporation. After the ethyl acetate is no longer observed to be evaporating, the sample is diluted with about 50 mL of ethanol and solvent evaporation operations are continued. The prepolymer sample is diluted with ethanol followed by rotary evaporation two more times. The sample is concentrated to a mass of about 50 grams. The prepolymer is isolated by mixing the ethanol solution with about 700 mL of deionized water. The prepolymer is separated from the solvents and then washed with about 3×500 mL of deionized water. The prepolymer is then allowed to soak in about 500 mL of deionized water overnight. The prepolymer is separated from deionized water and then dissolved in about 50 mL of ethanol. Ethanol is removed by rotary evaporation. After the ethanol is no longer observed to be evaporating, the prepolymer is diluted with about 50 mL of fresh ethanol and solvent evaporation is continued. The prepolymer solution is diluted with about 50 mL of ethanol followed by rotary evaporation two more times. The prepolymer solution is concentrated until solids content is about 60% and inhibited with about 5 mg of 4-HydroxyTEMPO dissolved in ethanol. The prepolymer is concentrated further by rotary evaporation until the solids content is about 71.6%. The flask used for rotary evaporation is rinsed with about 10 mL of ethanol and the rinses are allowed to vacuum dry under vacuum at room temperature. About 20 mg of copolymer is dissolved in about 1 mL of chloroform and a film is cast on a NaCl disk and allowed to dry under a stream of nitrogen for a about 1 minute prior to FT-IR analysis. FT-IR shows peaks near FT-IR: 3405, 2959, 1722, 1643, 1498, 1463, 1400, 1358, 1260, 1195, 1134, 1092, 1056, 843, and 757 cm$^{-1}$. Molecular weight is characterized by GPC. Weight average molecular weight ($M_w$)=34389, and number average molecular weight ($M_n$)=10294.

Example 16

Prepolymer solution (7.1965 grams) from Example 15 is mixed with 0.0385 grams of Daracure 1173 and 0.8237 grams of ethanol. Plastic molds are filled with lens formulation and then irradiated at about 3.5 mW/cm$^2$ with UVA light. Lenses are harvested from molds, extracted with isopropanol for about 30 minutes or more. The lenses are extracted in de-ionized water for about 30 minutes or more, placed in glass vials containing PBS and sterilized. Lenses are noted to be cloudy. Water contact angle is observed to be about 100°.

Example 17

Copolymer solution from Example 14 (104.07 grams, about 28.9% copolymer in ethyl aceate) is placed in a plastic beaker and mixed with 7.55 grams of NVP on a stir plate. The beaker is sealed with polyethylene plastic bag. The copolymer solution containing NVP is irradiated with UVA (intensity was about 3.3 mW/cm$^2$) for about 6 hours while being stirred. The intermediary copolymer solution is mixed with 0.0851 grams of dibutyltindilaurate and 0.8586 grams of 2-isocyanatoethylmethacrylate and the resulting mixture is heated at about 40° C. for about 4 hours. Ethylacetate is removed by rotary evaporation. After the ethyl acetate is no longer observed to be evaporating, the sample is diluted with about 50 mL of ethanol and solvent evaporation operations are continued. The prepolymer sample is diluted with ethanol followed by rotary evaporation two more times. The sample is concentrated to until its mass is about 50 grams. The prepolymer is isolated by mixing the ethanol solution with about 700 mL of deionized water. The prepolymer is separated from the solvents and then washed with about 3×500 mL of deionized water. The prepolymer is then allowed to soak in about 500 mL of deionized water overnight. The prepolymer is separated from deionized water and then dissolved in about 50 mL of ethanol. Ethanol is removed by rotary evaporation. After the ethanol is no longer observed to be evaporating, the prepolymer is diluted with about 50 mL of fresh ethanol and solvent evaporation is continued. The prepolymer solution is diluted with about 50 mL of ethanol followed by rotary evaporation two more times. The prepolymer solution is concentrated to about 66.9% concentration. The flask used for rotary evaporation is rinsed with about 10 mL of ethanol and the rinses are allowed to vacuum dry under vacuum at room temperature. About 20 mg of copolymer is dissolved in about 1 mL of chloroform and a film is cast on a NaCl disk and allowed to dry under a stream of nitrogen for about 1 minute prior to FT-IR analysis shows peaks near: 3405, 2959, 1723, 1643, 1496, 1463, 1399, 1357, 1260, 1195, 1133, 1092, 1056, 843, 802, and 757 cm$^{-1}$. Molecular weight is characterized by GPC. Weight average molecular weight ($M_w$)=21273, and number average molecular weight ($M_n$)=9894

Example 18

Lens Formulation and Preparation

Prepolymer solution (8.2687 grams) from example 17 is mixed with 0.0319 grams of Daracure 1173 and 1.4744 grams of ethanol. Preparation of contact lenses: Plastic molds are filled with lens formulation and then irradiated with UVA light at about 3.5 mW/cm$^2$ for about 45 minutes. After extraction and autoclave treatment a water contact angle (static) of lens samples is observed to be about 97°.

Example 19

Copolymer solution from example 14 is (104.07 grams, about 28.9% copolymer in ethyl acetate) is placed in a plastic beaker diluted further with 30 grams of ethyl acetate. The beaker is sealed in polyethylene plastic bag. The copolymer solution is irradiated with UVA (intensity was about 3.3 mW/cm$^2$) for about 6 hours while being stirred. The intermediary copolymer solution mixed with 0.0898 grams of dibutyltindilaurate and 0.8859 grams of 2-isocyanatoethylmethacrylate and the resulting mixture is heated at about 40° C. for about 4 hours. Ethyl acetate is removed by rotary evaporation and replaced with ethanol. The sample is concentrated to a mass of about 50 grams. The prepolymer is isolated by mixing the ethanol solution with about 700 mL of deionized water. The prepolymer is separated from the solvents and then washed with about 3×500 mL of deionized water. The prepolymer is dissolved in 50 mL of ethanol and then precipitated by mixing the ethanol solution with about 700 mL of de-ionized water. The prepolymer is separate from solvents and subjected to centrifugation to further remove water. The prepolymer is dissolved in ethanol and then concentrated by rotary evaporation. The prepolymer solution is concentrated until solids content is about 74.8%. The flask used for rotary evaporation is rinsed with about 5 mL of ethanol and the rinses are allowed dry under vacuum at room temperature. About 30 mg of copolymer is dissolved in about 1 mL of chloroform and a film is cast on a NaCl disk and allowed to dry under a stream of nitrogen for a about 1 minute prior to FT-IR analysis. FT-IR shows peaks near: 3385, 2959, 1723, 1642, 1498, 1463, 1400, 1358, 1260, 1195, 1134, 1092, 1057, 844, 802, and 757 cm$^{-1}$. Molecular weight is characterized by GPC. Weight average molecular weight ($M_w$)=18483, and number average molecular weight ($M_n$)=9997

Example 20

Lens formulation and Lens Preparation

Prepolymer solution (4.0879 grams) from example 19 is mixed with 0.0319 grams of Daracure 1173 and 1.0175 grams of ethanol. Preparation of contact lenses: Plastic molds are filled with lens formulation and then irradiated with UVA light at about 3.5 mW/cm$^2$ for about 45 minutes. Lenses are harvested from molds, extracted with isopropanol for about 30 minutes or more. The lenses are extracted in de-ionized water for about 30 minutes or more, placed in glass vials containing PBS and sterilized. Lenses are noted to be hazy and have a water contact angle (static) of about 102°.

Example 21

Preparation of Silicone-Containing Copolymer with Latent UV-AFRG Moieties

A copolymer is prepared from solution consisting of DMA (23.1214 grams), TRIS (22.0694 grams), HEMA (9.2677 grams), polydimethylsiloxanemonomethacrylate-MCR-M11 (38.1506 grams), VAZO-52 (0.5053 grams), 2-mercaptoethanol (0.2510 grams), polymerizable phenone (7.0197 grams) (prepared in Example 13) and ethyl acetate (200 mL).

The polymerization is carried out for about 24 hours under nitrogen at about 50° C. in a 1-liter jacketed glass reaction kettle equipped with stirring. The intermediary copolymer solution is inhibited with about 15 mg of 4-hydroxy-TEMPO dissolved in about 3 mL of ethyl acetate. The polymerization solution is transferred to a tarred jar and then the reaction vessel is rinsed with ethyl acetate. The ethyl acetate rinses are added to the jar containing the polymerization solution and the mass of the solution is adjusted to about 500 grams with ethyl acetate.

Example 22

Preparation of Silicone-Containing Copolymer with Latent UV-AFRG Moieties

A copolymer is prepared from solution consisting of DMA (31.0950 grams), TRIS (23.0876 grams), HEMA (9.2019 grams), polydimethylsiloxanemonomethacrylate-MCR-M11 (32.2184 grams), VAZO-52 (0.5091 grams), 2-mercaptoethanol (0.2390 grams), polymerizable phenone (5.0619 grams) (prepared in Example 13) and ethyl acetate (300 mL). The polymerization is carried out for about 24 hours under nitrogen at about 50° C. in a one liter jacketed glass kettle equipped with nitrogen inlet/outlet, condenser, and a stirring unit. After about 24 hours at 50° C., the copolymer solution was cooled to room temperature and inhibited with about 15 mg of 4-hydroxyTEMPO dissolved in about 5 mL of ethyl acetate. The reaction mixture is transferred to a storage container and the mass of the mixture is adjusted to 500.20 grams by the addition of ethyl acetate.

Example 23

Copolymer solution (62.57 grams) from example 22 is combined with 0.0421 grams of dibutyltindilaurate and 0.5291 grams of 2-isocyanatoethylmethacrylate and the resulting mixture is heated at about 40° C. for about 4 hours. Ethyl acetate is removed from the copolymer solution by rotary evaporation and replaced with 1-propanol. The copolymer solution in 1-propanol is concentrated to a solids content of about 68.0%. The weight average molecular weight of copolymer is about 55608 and number average molecular weight is about 27549 as measured by gel permeation chromatography (GPC). FT-IR analysis of copolymer that is cast on a NaCl disk, and dried shows peaks near 3379, 2960, 1724, 1643, 1502, 1463, 1402, 1260, 1058, 844, and 803 $cm^{-1}$. The absorbance ratio of C=O (amide)/C=O (ester) is about 1.25.

Example 24

A lens formulation is prepared by mixing 4.4580 grams of the copolymer solution from example 23 with 0.0281 grams of Daracure 1173 and 0.5628 grams of 1-propanol. Contact lenses are prepared by filling plastic molds with lens formulation, irradiating the plastic molds with UVB light at about 4 $mW/cm^2$ for about 20 seconds. Lenses are extracted with isopropanol for about 30 minutes or more. The lenses are extracted in de-ionized water for about 30 minutes or more, placed in glass vials containing PBS and sterilized. Clear lenses are obtained.

Example 25

A lens formulation is prepared by mixing 4.5837 grams of copolymer solution from example 23 with 0.5560 grams DMA and 0.0351 grams of Daracure 1173. Plastic molds are filled with lens formulation and then irradiated under UVA at bout 3.5 mW/cm2 for about 30 minutes. Lenses are extracted with isopropanol for about 30 minutes or more. The lenses are extracted in de-ionized water for about 30 minutes or more, placed in glass vials containing PBS and sterilized. Clear lenses are obtained. Water contact angle on lens samples is observed to be about 83° (advancing), and 22° (receding). Lens Dk is about 54 barrer and lens ion permeability is about 9. Lens modulus is about 1.37 MPa and elongation at break is about 67%

Example 26

Copolymer solution (62.5133 grams) from example 22 is combined with DMA (6.3496 grams), MMA (1.2469 grams) and ethyl acetate (50 mL) in a 400 mL plastic beaker. The beaker is placed in a polyethylene plastic bag and the bag is inflated with nitrogen and then deflated a total of three times and then sealed. The sample is irradiated with UVA light at about 3.4 $mW/cm^2$ while being stirred. After being irradiated for a total of about 6 hours, the reaction mixture is inhibited with about 15 mg of 4-hydroxy-TEMPO dissolved in about 3 mL of ethyl acetate. The intermediary copolymer solution mixed with 0.0552 grams of dibutyltindilaurate and 0.5253 grams of 2-isocyanatoethylmethacrylate and the resulting mixture is heated at about 40° C. for about 4 hours. Ethyl acetate is removed from the copolymer by rotary evaporation and replaced with 1-propanol. Solvent is removed by from the copolymer solution until a copolymer concentration of about 64.1% is reached. About 0.53 grams of copolymer solution is diluted with a few mL of ethanol and the resulting solution is allowed to dry under vacuum at room temperature. About 30 mg of copolymer is dissolved in about 1 mL of chloroform and a film is cast on a NaCl disk and allowed to dry under a stream of nitrogen for a about 1 minute prior to FT-IR analysis. FT-IR analysis shows peaks near: 3421, 2959, 1724, 1641, 1498, 1458, 1414, 1400, 1357, 1260, 1196, 1136, 1093, 1057, 844, 802, and 757 $cm^{-1}$. Molecular weight is characterized by GPC. Weight average molecular weight ($M_w$)=60273 and number average molecular weight ($M_n$) =28178.

Example 27

A lens formulation is prepared by mixing 5.6788 grams of the copolymer solution from example 26 with 0.0348 grams of Daracure 1173 and 0.3475 grams of 1-propanol. Contact lenses are prepared by filling plastic molds with lens formulation, irradiating the plastic molds with UVB light at about 4 $mW/cm^2$ for about 20 seconds. Lenses are extracted with isopropanol for about 30 minutes or more. The lenses are extracted in de-ionized water for about 30 minutes or more, placed in glass vials containing PBS and sterilized. Lenses are noted to be cloudy.

Example 28

Copolymer solution (62.76 grams) from example 22 is combined with DMA (6.3175 grams) and ethyl acetate (50 mL) in a 400 mL plastic beaker. The beaker is placed in a polyethylene plastic bag and the bag is inflated with nitrogen and then deflated a total of three times and then sealed. The sample is irradiated with UVA light at about 3.4 $mW/cm^2$ while being stirred. After being irradiated for a total of about 6 hours, the reaction mixture is inhibited with about 25 mg of 4-hydroxy-TEMPO. The intermediary copolymer solution is mixed with 0.0487 grams of dibutyltindilaurate and 0.5105 grams of 2-isocyanatoethylmethacrylate and the resulting mixture is heated at about 40° C. for about 4 hours. Ethyl acetate is removed from the copolymer by rotary evaporation and replaced with 1-propanol. Solvent is removed from the copolymer solution until a copolymer concentration of about 55.5% is reached. The weight average molecular weight of copolymer is about 66528 and number average molecular weight is about 21389 as measured by GPC. Copolymer that is purified by extraction of a chloroform solution with water prior to GPC analysis gives a weight average molecular weight of about 70550 and a number average molecular weight of about 24072. FT-IR analysis of the purified copolymer shows peak absorptions at about 3400, 2959, 1723 (C=O, ester), 1642 (C=O, amide), 1498, 1400, 1356, 1260, 1138, 1094, 1058, 844, 803, and 757 cm$^{-1}$. The absorbance ratio of C=O (amide)/C=O (ester) is about 1.71. This represents an increase in amide/ester ratio as compared to a C=O (amide)/C=O (ester) ratio of about 1.25 for non-UV-grafted copolymer (copolymer from example 23).

Example 29

A lens formulation is prepared by mixing 5.6081 grams of the copolymer solution from example 28 with 0.0472 grams of Daracure 1173. Contact lenses are prepared by filling plastic molds with lens formulation, irradiating the plastic molds with UVA light at about 3.5 mW/cm$^2$ for about 30 minutes. Lenses are harvested from molds, and are extracted with isopropanol for about 30 minutes or more. The lenses are extracted in de-ionized water for about 30 minutes or more, placed in glass vials containing PBS and sterilized. Clear lenses are obtained. Water contact angle on lens samples is about 96° (static), 101° (advancing) and 23° (receding). Lens Dk is about 51 barrer as measured by polargraphic method and an ion permeability is about 50. Lenses are tensile tested and have a modulus of about 0.46 MPa and an elongation at break of about 81%. Contact lenses are also produced by curing lens formulation with UVB light at about 4 mW/cm$^2$ for about 20 seconds.

Example 30

Copolymer solution (62.55 grams) from example 22 is combined with DMA (3.7938 grams), MMA (0.7891 grams) and ethyl acetate (50 mL) in a plastic beaker. The beaker is placed in a polyethylene plastic bag and the bag is inflated with nitrogen and then deflated a total of three times and then sealed. The sample is irradiated with UVA light at about 3.4 mW/cm$^2$ while being stirred. After being irradiated for a total of about 6 hours, the reaction mixture is inhibited with about 15 mg of 4-hydroxy-TEMPO dissolved in about 3 mL of ethyl acetate. The intermediary copolymer solution mixed with 0.0496 grams of dibutyltindilaurate, 250 mL of ethyl acetate and 0.5281 grams of 2-isocyanatoethylmethacrylate and the resulting mixture is heated at about 40° C. for about 4 hours. Ethyl acetate is removed from the copolymer by rotary evaporation and replaced with 1-propanol. Solvent is removed from the copolymer solution until a copolymer concentration of about 51% is reached. A film of the copolymer solution is prepared by smearing sample on a NaCl disk and then drying the film under a stream of nitrogen for about 2 minutes prior to FT-IR analysis. FT-IR analysis shows peaks near: 3421, 2959, 1724, 1642, 1498, 1457, 1414, 1400, 1357, 1260, 1196, 1136, 1094, 1057, 844, 802, and 757 cm$^{-1}$. Molecular weight is characterized by GPC. A main peak with weight average molecular weight ($M_w$)=108975 and number average molecular weight ($M_n$)=22290 is observed. A higher molecular weight species with weight average molecular weight ($M_w$) of about=743879 and number average molecular weight ($M_n$) of about =693761 is also observed.

Example 31

A lens formulation is prepared by mixing 5.8794 grams of the copolymer solution from example 30 with 0.0371 grams of Daracure 1173 and 0.1625 grams of 1-propanol Contact lenses are prepared by filling plastic molds with lens formulation, irradiating the plastic molds with UVB light at about 4 mW/cm$^2$ for about 20 seconds. Lenses are extracted with isopropanol for about 30 minutes or more. The lenses are extracted in de-ionized water for about 30 minutes or more, placed in glass vials containing PBS and sterilized. Lenses are noted to be slightly cloudy.

Example 32

Copolymer solution (62.5133 grams) from example 21 is combined with DMA (6.3334 grams), MMA (1.2563 grams) and ethyl acetate (50 mL) in a 400 mL plastic beaker. The beaker is placed in a polyethylene plastic bag and the bag is inflated with nitrogen and then deflated a total of three times and then sealed. The sample is irradiated with UVA light at about 3.3 mW/cm$^2$ while being stirred. After being irradiated for a total of about 6 hours, the reaction mixture is inhibited with about 16 mg of 4-hydroxy-TEMPO. The intermediary copolymer solution is mixed with 0.0352 grams of dibutyltindilaurate and 0.5152 grams of 2-isocyanatoethylmethacrylate and the resulting mixture is heated at about 40° C. for about 4 hours. Ethyl acetate is removed from the copolymer by rotary evaporation and replaced with 1-propanol. The copolymer solution is concentrated to a final mass of about 32.76 grams. The solids content of the copolymer solution is determined to be about 51.3% by gravimetric analysis. A few drops of copolymer is spread on a NaCl disk and the resulting film is dried under a stream of nitrogen for about 2 minutes prior to FT-IR analysis. FT-IR analysis shows peak near: 3421, 2959, 1724, 1642, 1498, 1458, 1412, 1400, 1357, 1260, 1195, 1137, 1093, 1058, 844, 802, and 757 cm$^{-1}$. The flask used for rotary evaporation is rinsed with about 10 mL of ethanol and the resulting solution is allowed to dry prior to molecular weight analysis by GPC. Weight average molecular weight ($M_w$))=195912 and number average molecular weight ($M_n$)=26866.

Example 33

Copolymer solution (7.8503 grams) from example 32 is mixed with Daracure 1173 (0.0797 grams) and 1-propanol (0.2348 grams). Contact lenses are prepared by filling plastic molds with lens formulation, irradiating the plastic molds with UVA light at about 3.5 mW/cm$^2$ for about 45 minutes. Lenses are harvested from molds and are extracted with isopropanol for about 30 minutes or more. The lenses are extracted in de-ionized water for about 30 minutes or more, placed in glass vials containing PBS and sterilized. Clear lenses are obtained and water forms a contact angle of about 97° (static), 101° (advancing) and 57° (receding) with the lenses. Lens Dk is about 40 barrer as measured by polargraphic method and ion permeability is measured to be about 50.

Example 34

A lens formulation is prepared by mixing 4.5946 grams of copolymer solution from example 23 with 1.0556 grams of DMA and 0.0521 grams of Daracure 1173. Plastic molds are filled with lens formulation and then irradiated under UVA light at about 3.5 mW/cm² for about 45 minutes. Lenses are extracted with isopropanol for about 30 minutes or more. The lenses are extracted in de-ionized water for about 30 minutes or more, placed in glass vials containing PBS and sterilized. Clear lenses are obtained. Water forms a contact angle of about 90° (advancing) and 55° (receding) with the lenses. Lens Dk is about 40 barrer as measured by polarographic method and lens ion permeability is measured to be about 17. Tensile testing shows lens modulus is about 1.25 MPa and elongation at break is about 55%

What is claimed is:

1. A soft contact lens, comprising a silicone hydrogel material obtained by curing a lens-forming material in a mold, wherein the lens-forming material comprises an actinically crosslinkable prepolymer and at least one first hydrophilic vinylic monomer, wherein the prepolymer comprises: in the copolymer chain of the prepolymer, (1) siloxane units derived from one or more siloxane-containing vinylic monomers and/or one or more siloxane-containing macromers;

(2) hydrophilic units derived from one or more second hydrophilic vinylic monomers and/or one or more hydrophilic macromers;

(3) chain-extending units having latent UV-AFRG moieties and derived from one or more vinylic monomer of formula (II) or (III)

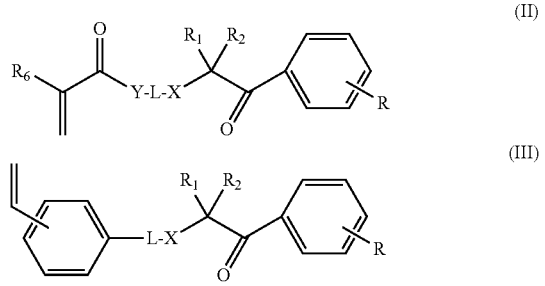

in which

R is H, $C_1$-$C_{12}$ alkyl, $C_1C_{12}$ alkoxy, $C_1$-$C_{12}$ alkyl-NH— or —$NR_3R_4$ wherein $R_3$ and $R_4$ independent of each other are $C_1$-$C_8$ alkyl, $R_1$ and $R_2$ independent of each other are hydrogen, $C_1$-$C_8$ alkyl, $C_1$-$C_8$ cycloalkyl, or $C_1$-$C_8$ aryl, or $R_1$ and $R_2$ together are —(CH$_2$)$_n$— where n is an integer from 2 to 6, X is a linkage selected from the group consisting of

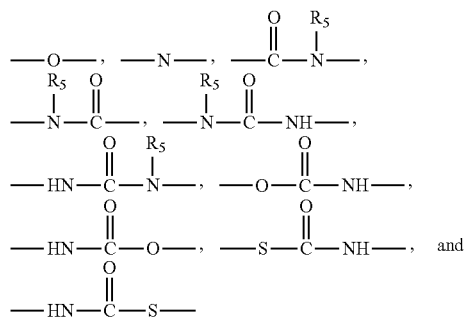

where $R_5$ is H or $C_1$-$C_8$ alkyl,

Y is bivalent —$NR_5$— or —O—,

L is a divalent radical selected from the group consisting of $C_1$-$C_{12}$ alkylene radical, $C_1C_{12}$ substituted alkylene radical, $C_1$-$C_{12}$ cycloalkylene radical, and $C_8$-$C_{16}$ arylalkylene radical, and $R_6$ is H or CH$_3$; and (4) ethylenically unsaturated groups, wherein the silicone hydrogel material includes dangling hydrophilic polymer chains each of which is formed from the first hydrophilic vinylic monomer and covalently attached to the polymer matrix of the silicone hydrogel material through one of the chain-extending units, wherein the formed soft contact lens has a hydrophilic surface without post-curing surface treatment.

2. The soft contact lens of claim 1, wherein the prepolymer is obtained from an intermediary copolymer having pendant first functional groups by attaching covalently ethylenically unsaturated groups to the first functional groups, wherein the intermediary copolymer is obtained by thermal copolymerization of a composition comprising (1) at least one siloxane-containing monomer having one ethylenically unsaturated group, at least one siloxane-containing macromer having one ethylenically unsaturated group, at least one siloxane-containing monomer having two or more ethylenically unsaturated groups, at least one siloxane-containing macromer having two or more ethylenically unsaturated groups, or a combination of two or more thereof; (2) at least one hydrophilic vinylic monomer; (3) at least one vinylic monomer of formula (II) or (III); and (4) a thermal initiator, provided that at least one of the polymerizable components contains a first functional group.

3. The soft contact lens of claim 2, wherein the composition further comprises one or more polymerizable components selected from the group consisting of a silicone-free crosslinker with molecular weight less than 700 daltons, a hydrophobic vinylic monomer, a chain transfer agent having a functional group capable of undergoing coupling reaction with another function group.

4. The soft contact lens of claim 2, wherein the composition comprises a polysiloxane-containing monomer or macromer with one sole ethylenically unsaturated group.

5. The soft contact lens of claim 2, wherein the composition comprises 3-methacryloxy propylpentamethyldisiloxane, bis(methacryloxypropyl)tetramethyl-disiloxane, N-[tris(trimethylsiloxy)silylpropyl]acrylamide, N-[tris(trimethylsiloxy)silylpropyl]methacrylamide, tristrimethylsilyloxysilylpropyl methacrylate (TRIS), N-[tris(trimethylsiloxy)silylpropyl]methacrylamide ("TSMAA"), N-[tris(trimethylsiloxy)-silylpropyl]acrylamide ("TSAA"), (3-methacryloxy-2-hydroxypropyloxy)propylbis(trimethylsiloxy) methylsilane), (3-methacryloxy-2-hydroxypropyloxy)propyltris(trimethylsiloxy)silane, 3-methacryloxy-2-(2-hydroxyethoxy)propyloxy)propylbis(trimethylsiloxy)methylsilane, N-2-methacryloxyethyl-O-(methyl-bis-trimethylsiloxy-3-propyl)silyl carbamate, 1,3-bis[4-vinyloxycarbonyloxy)but-1-yl]tetramethyl-disiloxane, 3-(trimethylsilyl) propyl vinyl carbonate, 3-(vinyloxycarbonylthio)propyl-[tris(trimethylsiloxy)silane], 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethylsiloxyethyl vinyl carbonate, trimethylsilylethyl vinyl carbonate, trimethylsilylmethyl vinyl carbonate, or a mixture thereof.

6. The soft contact lens of claim 2, wherein the composition comprises N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propyl methacrylate hydrochloride, aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, N-vinyl caprolactam, or a mixture thereof.

7. The soft contact lens of claim 2, wherein the first functional groups are amine, hydroxyl, carboxyl, isocyanate, or epoxy groups, wherein ethylenically functionalizing of the intermediary copolymer is carried out by reacting a vinylic monomer having a hydroxy, amino, carboxyl, epoxy, acid-chloride, isocyanate group, which is coreactive with the first functional groups of the intermediary copolymer in the absence or presence of a coupling agent.

8. The soft contact lens of claim 1, wherein the first hydrophilic monomer is N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, or N-vinyl caprolactam.

9. The soft contact lens of claim 8, wherein the lens forming material further comprises at least one member selected from the group consisting of a photoinitiator, a visibility tinting agent, a UV-blocking (absorbing) agent, a photosensitizer, an antimicrobial agent, a bioactive agent, a leachable lubricant, and a combination thereof.

10. The soft contact lens of claim 1, wherein the soft contact lens has at least one property selected from the group consisting of an oxygen permeability of preferably at least about 35 barriers, an elastic modulus of from about 0.2 MPa to about 2.0 MPa, an Ionoflux Diffusion Coefficient, D, of at least about $1.5 \times 10^{-6}$ mm$^2$/min, and a water content of preferably from about 15% to about 60% by weight.

11. The soft contact lens of claim 10, wherein the soft contact has a surface hydrophilicity characterized by having an averaged water contact angle of about 100 degrees or less.

12. The soft contact lens of claim 3, wherein the composition comprises 3-methacryloxy propylpentamethyldisiloxane, bis(methacryloxypropyl)tetramethyl-disiloxane, N-[tris(trimethylsiloxy)silylpropyl]acrylamide, N-[tris(trimethylsiloxy)silylpropyl]methacrylamide, tristrimethylsilyloxysilylpropyl methacrylate (TRIS), N-[tris(trimethylsiloxy)silylpropyl]methacrylamide ("TSMAA"), N-[tris(trimethylsiloxy)-silylpropyl]acrylamide ("TSAA"), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)propyloxy)propylbis(trimethylsiloxy) methylsilane, N-2-methacryloxyethyl-O-(methyl-bis-trimethylsiloxy-3-propyl)silyl carbamate, 1,3-bis[4-vinyloxycarbonyloxy)but-1-yl]tetramethyl-disiloxane, 3-(trimethylsilyl) propyl vinyl carbonate, 3-(vinyloxycarbonylthio)propyl-[tris(trimethylsiloxy)silane], 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethylsiloxyethyl vinyl carbonate, trimethylsilylethyl vinyl carbonate, trimethylsilylmethyl vinyl carbonate, or a mixture thereof.

13. The soft contact lens of claim 4, wherein the composition comprises 3-methacryloxy propylpentamethyldisiloxane, bis(methacryloxypropyl)tetramethyl-disiloxane, N-[tris(trimethylsiloxy)silylpropyl]acrylamide, N-[tris(trimethylsiloxy)silylpropyl]methacrylamide, tristrimethylsilyloxysilylpropyl methacrylate (TRIS), N-[tris(trimethylsiloxy)silylpropyl]methacrylamide ("TSMAA"), N-[tris(trimethylsiloxy)-silylpropyl]acrylamide ("TSAA"), (3-methacryloxy-2-hydroxypropyloxy)propylbis(trimethylsiloxy) methylsilane), (3-methacryloxy-2-hydroxypropyloxy)propyltris(trimethylsiloxy)silane, 3-methacryloxy-2-(2-hydroxyethoxy)propyloxy)propylbis(trimethylsiloxy) methylsilane, N-2-methacryloxyethyl-O-(methyl-bis-trimethylsiloxy-3-propyl)silyl carbamate, 1,3-bis[4-vinyloxycarbonyloxy)but-1-yl]tetramethyl-disiloxane, 3-(trimethylsilyl) propyl vinyl carbonate, 3-(vinyloxycarbonylthio)propyl-[tris(trimethylsiloxy)silane], 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethylsiloxyethyl vinyl carbonate, trimethylsilylethyl vinyl carbonate, trimethylsilylmethyl vinyl carbonate, or a mixture thereof.

14. The soft contact lens of claim 4, wherein the composition comprises N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, a $C_1$-$C_4$alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, N-vinyl caprolactam, or a mixture thereof.

15. The soft contact lens of claim 5, wherein the composition comprises N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, N-vinyl caprolactam, or a mixture thereof.

* * * * *